United States Patent
Jacobson et al.

(10) Patent No.: US 10,473,270 B2
(45) Date of Patent: Nov. 12, 2019

(54) LEAK DETECTION USER INTERFACES

(71) Applicant: General Electric Company, Schenectady, NY (US)

(72) Inventors: Bruce J. Jacobson, San Ramon, CA (US); Ryan McCormack, San Ramon, CA (US); Gandeephan Ganeshalingam, Calgary (CA); Trent Gillham, New Orleans, LA (US); Mauricio Palomino, Houston, TX (US); Glen Peter Koste, Niskayuna, NY (US); Ehsan Jalilian, Calgary (CA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/720,789

(22) Filed: Sep. 29, 2017

(65) Prior Publication Data

US 2018/0094775 A1  Apr. 5, 2018

Related U.S. Application Data

(60) Provisional application No. 62/402,165, filed on Sep. 30, 2016.

(51) Int. Cl.
*G08B 3/00* (2006.01)
*G08B 5/00* (2006.01)
(Continued)

(52) U.S. Cl.
CPC ............ *F17D 5/06* (2013.01); *F17D 3/01* (2013.01); *F17D 5/005* (2013.01); *F17D 5/02* (2013.01);
(Continued)

(58) Field of Classification Search
CPC .. F17D 5/06; F17D 3/01; F17D 5/005; G01M 3/00; G08B 21/18; G08B 21/20; G05B 15/02; G06Q 10/20
See application file for complete search history.

(56) References Cited

U.S. PATENT DOCUMENTS 6,957,157 B2 * 10/2005 Lander .................. G01M 3/243
                                                      340/605
7,920,983 B1     4/2011 Peleg et al.
(Continued)

FOREIGN PATENT DOCUMENTS

EP       2 902 764 A1     8/2015

OTHER PUBLICATIONS

Dominion Updates Outage Map to Include Additional Restoration Data (Year: 2016).*
(Continued)

*Primary Examiner* — Quang Pham
(74) *Attorney, Agent, or Firm* — Mintz Levin Cohn Ferris Glovsky and Popeo, P.C.

(57) ABSTRACT

Leak detection user interfaces are provided. In general, a user interface for a pipeline management system can be configured to provide information regarding one or more pipelines to a user. The information can include data gathered using one or more sensors sensing various parameters. The information on the user interface can include results of analysis of the gathered data, such as notifications that the gathered data indicates an anomaly with a pipeline. The notifications of anomalies can be provided on the user interface in real time with the data analysis. Accordingly, the user can trigger one or more corrective actions such as notifying maintenance personnel local to a location of the identified anomaly, remotely controlling the pipeline with the anomaly to close valve(s) and/or other equipment to
(Continued)

prevent fluid flow in the pipeline in the area of the detected anomaly, etc.

20 Claims, 43 Drawing Sheets

(51) Int. Cl.

| | | |
|---|---|---|
| *G08B 7/00* | (2006.01) | |
| *F17D 5/06* | (2006.01) | |
| *F17D 3/01* | (2006.01) | |
| *F17D 5/00* | (2006.01) | |
| *G01M 3/00* | (2006.01) | |
| *G08B 21/18* | (2006.01) | |
| *G08B 21/20* | (2006.01) | |
| *F17D 5/02* | (2006.01) | |
| *G01M 3/28* | (2006.01) | |
| *G01M 5/00* | (2006.01) | |
| *G05B 15/02* | (2006.01) | |
| *G06Q 10/00* | (2012.01) | |

(52) U.S. Cl.
CPC ............ *G01M 3/00* (2013.01); *G01M 3/2807* (2013.01); *G01M 5/0025* (2013.01); *G08B 21/18* (2013.01); *G08B 21/20* (2013.01); *G05B 15/02* (2013.01); *G06Q 10/20* (2013.01)

(56) References Cited

U.S. PATENT DOCUMENTS

| | | | | |
|---|---|---|---|---|
| 2003/0079774 A1* | 5/2003 | Reyman | ................ | F16K 17/36 137/38 |
| 2003/0167847 A1* | 9/2003 | Brown | ................ | G01M 3/243 73/592 |
| 2004/0093174 A1* | 5/2004 | Lander | ................ | G01M 3/243 702/56 |
| 2005/0245232 A1* | 11/2005 | Jakober | ................ | G08B 27/005 455/410 |
| 2006/0020487 A1* | 1/2006 | Spittel | ................ | G06Q 10/02 705/5 |
| 2006/0154642 A1* | 7/2006 | Scannell, Jr. | ............ | A01G 9/02 455/404.1 |
| 2007/0044539 A1* | 3/2007 | Sabol | ................ | G06Q 10/06 73/19.01 |
| 2007/0171046 A1* | 7/2007 | Diem | ................ | G06Q 10/00 340/539.13 |
| 2008/0215256 A1* | 9/2008 | Hill | ................ | F17D 5/00 702/36 |
| 2008/0304641 A1* | 12/2008 | Rowe | ................ | H04M 11/04 379/111 |
| 2011/0012738 A1* | 1/2011 | Nakamura | ............ | F23N 5/184 340/632 |
| 2011/0093220 A1* | 4/2011 | Yang | ................ | G01M 3/243 702/51 |
| 2012/0007743 A1* | 1/2012 | Solomon | ................ | G01M 3/243 340/605 |
| 2012/0194336 A1* | 8/2012 | Thiruvengada | .. | G08B 13/19645 340/525 |
| 2012/0265353 A1 | 10/2012 | Silvernail et al. | | |
| 2013/0006520 A1* | 1/2013 | Dhanani | ............ | G01C 21/3697 701/424 |
| 2013/0097609 A1* | 4/2013 | Li | ................ | G06F 1/203 718/104 |
| 2013/0214925 A1* | 8/2013 | Weiss | ................ | G08B 25/001 340/539.11 |
| 2013/0298642 A1 | 11/2013 | Gillette, II | | |
| 2013/0332023 A1* | 12/2013 | Bertosa | ................ | G07C 5/006 701/29.4 |
| 2015/0066286 A1* | 3/2015 | Connolly | ................ | G06Q 10/00 701/29.6 |
| 2015/0067018 A1* | 3/2015 | Connolly | ................ | G06Q 30/016 709/202 |
| 2015/0377716 A1* | 12/2015 | Kulkarni | ............ | G01D 5/35358 374/161 |
| 2016/0036898 A1* | 2/2016 | Curtis | ................ | H04L 67/10 709/203 |
| 2016/0063845 A1* | 3/2016 | Lloyd | ................ | G08B 21/187 340/679 |
| 2016/0071403 A1* | 3/2016 | Vaidhyanatan | ........ | G08B 27/00 340/502 |
| 2016/0103433 A1* | 4/2016 | Sahni | ................ | G06F 3/0484 700/83 |
| 2016/0140299 A1* | 5/2016 | Al Harbi | ................ | G16H 40/20 705/2 |
| 2016/0205123 A1* | 7/2016 | Almurayh | ........... | H04L 63/1425 726/23 |
| 2016/0359325 A1* | 12/2016 | Kawata | ................ | H02J 3/14 |
| 2017/0019498 A1* | 1/2017 | Ng | ................ | H04L 67/327 |
| 2017/0076563 A1* | 3/2017 | Guerriero | ............ | G06F 16/245 |
| 2017/0097827 A1* | 4/2017 | Furtado | ................ | G06Q 10/00 |
| 2017/0193414 A1* | 7/2017 | Finkel | ................ | G06Q 10/063 |

OTHER PUBLICATIONS

International Search Report and Written Opinion issued in connection with corresponding PCT Application No. PCT/US2017/054749 dated May 2, 2018.

International Invitation to Pay Additional Fees issued in connection with corresponding PCT Application No. PCT/US2017/054749 dated Jan. 16, 2018.

* cited by examiner

APM - Pipeline Leak monitoring        Users - CIC DEMO        Powered by Predix and hifi HDS Monitor
Analyze
Users
Help Enter User Information

| User ID | Username | Email | Company | Roles |
|---|---|---|---|---|
| b2d22a29-2fca-40b0-9106-bc36cfc9f5d3 | Name | Email address | com.cic | * |
| ae5fb75c-4741-4a40-8fa9-0ee28e04a7fd | Name | Email address | com.cic | OPERATOR |
| 63075f6d-d70d-4fcb-bd40-eec6b7e22739 | Name | Email address | com.cic | OPERATOR |
| 6aeed49d-07a2-4703-a3b1-93c73ddba692 | Name | Email address | com.cic | OPERATOR |
| 8a0ccb2d-0a99-42dd-bbf5-a8c4aef60804 | Name | Email address | com.cic | OPERATOR |
| a06256c8-a958-453a-8489-27a0d8b7c481 | Name | Email address | com.cic | OPERATOR |
| 3b71da0c-9028-4eb2-866d-a82b5ba65af7 | Name | Email address | com.cic | OPERATOR |
| 484cc474-5b1c-4aec-8e0b-fad5b5f69311 | Name | Email address | com.cic | OPERATOR |
| b53d7cb9-f31a-4aad-94a0-551dcaa7e3cf | Name | Email address | com.cic | OPERATOR |
| 2f506510-8c72-4fee-95bb-397b26ff4e75 | Name | Email address | com.cic | OPERATOR |
| 28cc2fb9-76b6-4c51-bd51-4a7b8412bbca | Name | Email address | com.cic | ADMIN |
| 63227942-f84f-4a73-8144-af8c0243a327 | Name | Email address | com.cic | USER |
| 87983836-aa81-4b8d-8d7f-10f612cc0d3c | Name | Email address | com.cic | USER |
| c4492b82-647a-4d60-a3f0-ef56118ab3d1 | Name | Email address | com.cic | USER |

FIG. 9

| APM - Pipeline Leak monitoring | | Users - CIC DEMO | | Powered by Predix and hifi HDS |
|---|---|---|---|---|
| ● Monitor | Enter User Information | | | |
| ○ Analyze | | | | |
| ⊗ Users | Add Users | | | |
| ⊘ Help | Start Registration Process | | | |
| | Emails | | | |
| | Enter emails | | | |
| | Roles | | | |
| | USER ▾ | | | |
| | | Send Registration Email | Close | |
| | User ID | | Company | Roles |
| | b2d22a29-2fca-40b0-9106-bc36cf | | com.cic | * |
| | ae5fb75c-4741-4a40-8fa9-0ee28e | | com.cic | OPERATOR |
| | 63075f6d-d70d-4fcb-bd40-eec6b7 | | com.cic | OPERATOR |
| | 6aeed49d-07a2-4703-a3b1-93c73 | | com.cic | OPERATOR |
| | 8a0ccb2d-0a99-42dd-bbf5-a8c4ae | | com.cic | OPERATOR |
| | a06256c8-a958-453a-8489-27a0d | | com.cic | OPERATOR |
| | 3b71da0c-9028-4eb2-866d-a82b5ba65af7 | Name  Email address | com.cic | OPERATOR |
| | 484cc474-5b1c-4aec-8e0b-fad5b5f69311 | Name  Email address | com.cic | OPERATOR |
| | b53d7cb9-f31a-4aad-94a0-551dcaa7e3cf | Name  Email address | com.cic | OPERATOR |
| | 2f506510-8c72-4fee-95bb-397b26ff4e75 | Name  Email address | com.cic | OPERATOR |
| | 28cc2f b9-76b6-4c51-bd51-4a7b8412bbca | Name  Email address | com.cic | ADMIN |
| | 63227942-f84f-4a73-8144-af8c0243a327 | Name  Email address | com.cic | USER |
| | 87983836-aa81-4b8d-8d7f-10f612cc0d3c | Name  Email address | com.cic | USER |
| | c4492b82-647-4d60-a3f0-ef56118ab3d1 | Name  Email address | com.cic | USER |

FIG. 10

APM - Pipeline Leak monitoring

Users - CiC DEMO

Powered by Predix and hifi HDS

Enter User Information

Edit Users

User ID: b2d22a29-2fca-40b0-9106-bc36cfc9f5d3

Username

Name

Email

Roles: USER

Save Changes    Close    Delete User

| User ID | Name | Email | Company | Roles |
|---|---|---|---|---|
| b2d22a29-2fca-40b0-9106-bc36cf | | | com.cic | * |
| ae5fb75c-4741-4a40-8fa9-0ee28e | | | com.cic | OPERATOR |
| 63075f6d-d70d-4fcb-bd40-eec6b7 | | | com.cic | OPERATOR |
| 6aeed49d-07a2-4703-a3b1-93c73 | | | com.cic | OPERATOR |
| 8a0ccb2d-0a99-42dd-bbf5-a8c4ae | | | com.cic | OPERATOR |
| a06256c8-a958-453a-8489-27a0d | | | com.cic | OPERATOR |
| 3b71da0c-9028-4eb2-866d-a82b5 | | | com.cic | OPERATOR |
| 484cc474-5b1c-4aec-8e0b-fad5b5 | | | com.cic | OPERATOR |
| b53d7cb9-f31a-4aad-94a0-551dcaa7e3cf | Name | Email address | com.cic | OPERATOR |
| 2f506510-8c72-4fee-95bb-397b26ff4e75 | Name | Email address | com.cic | OPERATOR |
| 28cc2fb9-76b6-4c51-bd51-4a7b8412bbca | Name | Email address | com.cic | ADMIN |
| 63227942-f84f-4a73-8144-af8c0243a327 | Name | Email address | com.cic | USER |
| 87983836-aa81-4b8d-8d7f-10f612cc0d3c | Name | Email address | com.cic | USER |
| c4492b82-647a-4d60-a3f0-ef56118ab3d1 | Name | Email address | com.cic | USER |

● Monitor
○ Analyze
Users
② Help

FIG. 11

FIBER SEGMENT 1 ▼          OPERATOR ▼
ORGANIZATION>PIPELINE

◆ UNACKNOWLEDGED ALARMS

No New Alarms
Last Updated: Date, Time

◆ ACKNOWLEDGED ALARMS

Sort By: [Time ▼]

◎ LEAK
Start Time      Date, Time
Duration        Ongoing
Post Location   160km + 100m
Action          Follow suspected
                Leak Procedure
[Log]  [Collapse]

Events ─────────────────────
          120      140      160      180      200
Post ─────┼────────┼────────┼────────┼────────┤
Assets ───▮────────▼────────▼────────▼────────▮
        Kingman  V-2354  V-7382  V-3564  Strome Start Time Date, Time   Duration 1:30m   GPS Location   Coordinates ◎ INTRUSION   [Expand]

PIPELINE 1 ▼  OPERATOR ▼
ORGANIZATION>PIPELINE

◈ UNACKNOWLEDGED ALARMS

No New Alarms
Last Updated: Date, Time

◈ ACKNOWLEDGED ALARMS   [Hide Logged Alarms ▼]

◉ LEAK
Start Time      Date, Time
Duration        00:15:00
Post Location   160.15km
Action          Follow suspected
                Leak Procedure
[Log]  [Detail]  [Collapse]

Events

Post    120       140       160       180       200

Assets  LaPorte   V-2354   V-7382   V-5464  V-3564  Griffith

FIG. 24

Monitor
○ Prevent

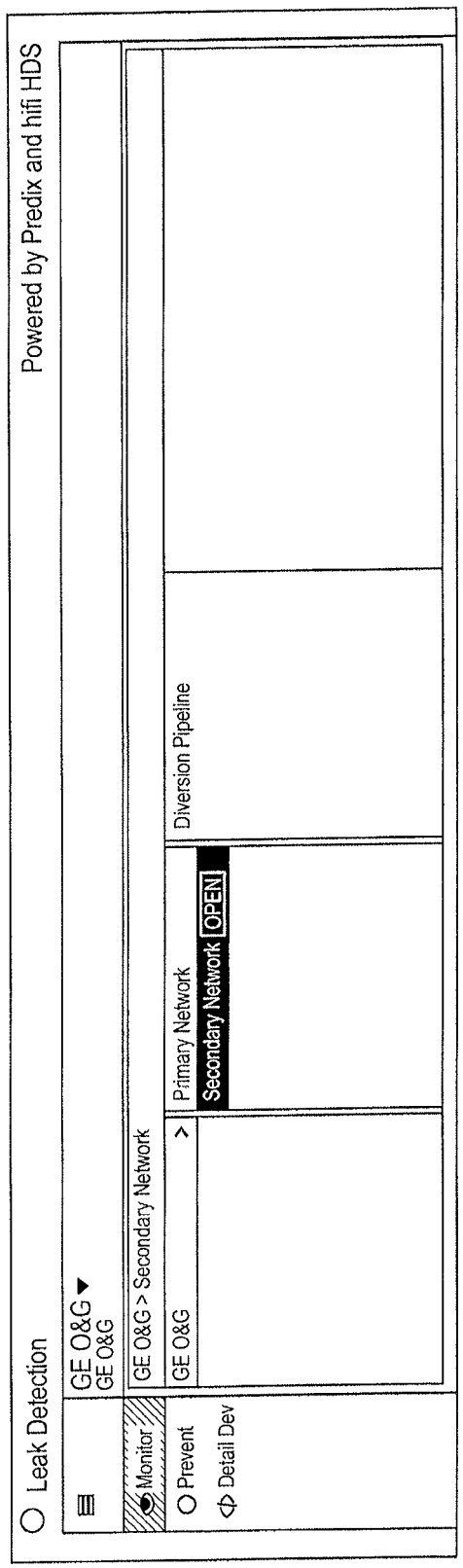
FIG. 29
FIG. 30
FIG. 31

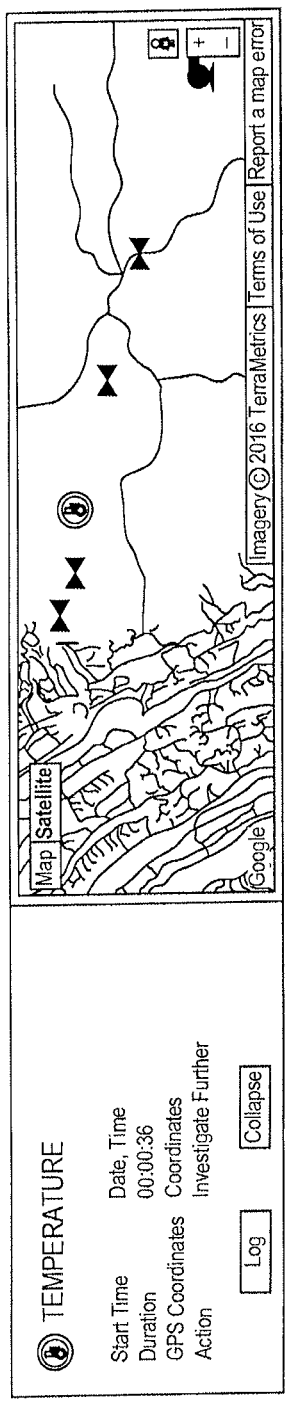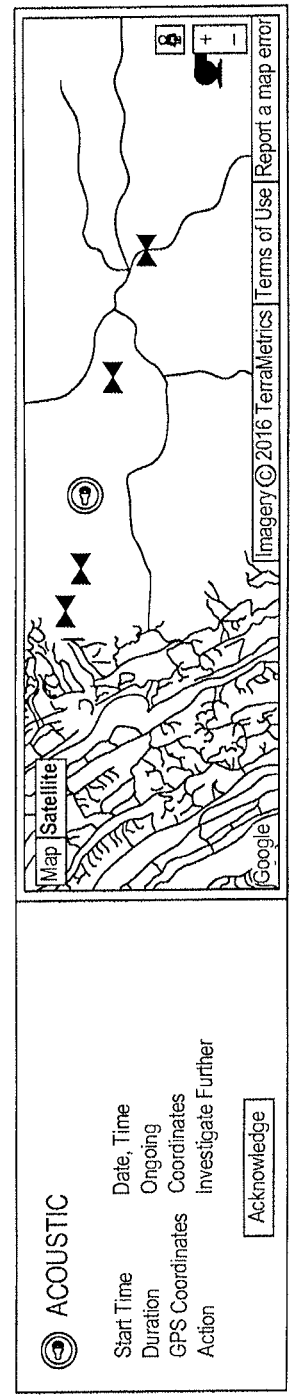
FIG. 38
FIG. 39

⊗ LOGGED ALARMS                                                                                                    Export to Excel

| Event ID | Event Type | Start Time | End Time | Duration | Acknowledged | Logged | Post | GPS | Comments |
|---|---|---|---|---|---|---|---|---|---|
| | Filter | Filter | Filter | Filter | Filter | Filter | Filter | Filter | |
| 88 | Leak | Date, Time | Date, Time | 00:15:00 | Date, Time | Date, Time | 160.15km | Coordinates | View |
| 89 | Acoustic | Date, Time | Date, Time | 00:00:45 | Date, Time | Date, Time | 724.82km | Coordinates | View |
| 90 | Temperature | Date, Time | Date, Time | 00:40:04 | Date, Time | Date, Time | 709.00km | Coordinates | View |
| 91 | Strain | Date, Time | Date, Time | 00:00:30 | Date, Time | Date, Time | 745.48km | Coordinates | View |
| 92 | Instrusion | Date, Time | Date, Time | 00:00:23 | Date, Time | Date, Time | 770.72km | Coordinates | View |
| 93 | Temperature | Date, Time | Date, Time | 00:00:32 | Date, Time | Date, Time | 780.23km | Coordinates | View |

Rows per page [5 ▾]    21-30 of 80    < 1 ❷ 3 4 5 _ 8 >

FIG. 41

LOGGED ALARMS

| Event ID | Event Type | Start Time | End Time | Duration | Acknowledged | Logged | Post | GPS | Comments |
|---|---|---|---|---|---|---|---|---|---|
| | Filter | Filter | Filter | Filter | Filter | Filter | Filter | Filter | |
| 88 | Leak | Date, Time | Date, Time | 00:15:00 | Date, Time | Date, Time | 160.15km | Coordinates | View |
| 89 | Acoustic | Date, Time | Date, Time | 00:00:45 | Date, Time | Date, Time | 724.82km | Coordinates | View |
| 90 | Temperature | Date, Time | Date, Time | 00:40:04 | Date, Time | Date, Time | 709.00km | Coordinates | View |
| 91 | Strain | Date, Time | Date, Time | 00:00:30 | Date, Time | Date, Time | 745.48km | Coordinates | View |
| 92 | Intrusion | Date, Time | Date, Time | 00:00:23 | Date, Time | Date, Time | 770.72km | Coordinates | View |
| 93 | Temperature | Date, Time | Date, Time | 00:00:32 | Date, Time | Date, Time | 780.23km | Coordinates | View |

Rows per page 5 ▾    21-30 of 80    < 1 ② 3 4 5 _ 8 >

Export to Excel

○ John Sinclair ▾ ⚙

Privacy  Terms  Contact  Accessibility  Cookies  ©2016 General Electric

LEAK DETECTION USER INTERFACES

CROSS-REFERENCE TO RELATED APPLICATIONS

This application claims priority to U.S. Provisional Patent Application No. 62/402,165 entitled "Leak Detection User Interfaces," filed Sep. 30, 2016, which is hereby incorporated by reference in its entirety.

BACKGROUND

Pipelines are commonly used to transport fluids over long distances that can range from tens to hundreds of kilometers. This includes pipelines being used to carry crude petroleum and natural gas from one location to another, such as from an oil well to a refinery for processing. In addition, pipelines can also be used to transport sewage and slurry from refineries.

Pipelines may be susceptible to leaks due to a number of factors, including wear and tear, accidents, and natural calamities. Loss of fluids due to leakage in the pipelines can result in the loss of revenue, which can be a significant amount reaching, at times, into the hundreds of millions of dollars. Additionally, pipeline leakage can adversely affect the environment. Therefore, it may be important to detect leakage in the pipelines. However, the large volume of data and/or the need to monitor multiple pipelines simultaneously can make it difficult for personnel to evaluate the information in a timely fashion. Revenue loss and/or environmental damage can thus occur before leaks are detected. It can also be difficult to present the information to personnel in a format that allows for quick evaluation and action.

Accordingly, there remains a need for improved methods and systems for detecting leaks in a pipeline.

SUMMARY

Leak detection user interfaces are provided.

In one embodiment, a detection system includes a memory storing instructions, a display configured to show a user interface thereon, and a processor configured to execute the instructions in the memory and thereby receive data indicative of one or more parameters sensed at a pipeline. The processor can analyze the data to determine whether an anomaly is present at the pipeline, and in response to determining that the anomaly is present, cause a notification to be presented on the user interface indicating that the anomaly is present.

The detection system can have any number of variations, and it can be configured to analyze data relating to various anomalies, including any one or more of a leak in the pipeline, an intrusion, strain, an acoustic event, and a rapid temperature change. The pipeline can include a single pipeline, or it can include multiple pipelines, and the notification can be coded to uniquely identify to a user of the user interface which one of the pipelines has the determined anomaly. In certain aspects, the notification can be coded to uniquely identify to a user of the user interface the type of anomaly detected, such as a leak, an intrusion, strain, an acoustic event, and a rapid temperature change. Fluid in the pipeline can include, for example, natural gas and/or petroleum. The detection system can include a client terminal that includes the display, and the client terminal can include one of a desktop computer, a workstation, a minicomputer, a laptop computer, a tablet computer, and a smart mobile phone.

The processor can further be configured to execute the instructions in the memory and thereby receive an acknowledgement of the notification from a user of the user interface and, in response to the receipt of the acknowledgement, cause detailed information regarding the anomaly to be shown on the user interface. The detailed information can include one or more of a map showing a geographic location of the anomaly, audio at a location of the anomaly, a history of previously detected anomalies at the pipeline, identity of equipment along the pipeline adjacent to a location of the anomaly, and sensed parameter data for a period of time prior to a time of the anomaly's occurrence. The sensed parameter data can include at least one of acoustic data, temperature data, frequency data, strain data, and fluid flow rate data.

In other aspects, the processor can be configured to execute the instructions in the memory and thereby receive an input from a user operating the user interface. The input can request a corrective action be performed to address the anomaly that is determined to be present. The corrective action can include notifying maintenance personnel remotely located from the user and located locally to the pipeline of the anomaly, and/or the corrective action can include an instruction to cause remote adjustment of at least one device operatively coupled to the pipeline. The at least one device can include at least one valve.

In another embodiment, a detection system includes a memory storing instructions, a display configured to show a user interface thereon to a user, and a processor configured to execute the instructions in the memory and thereby receive data indicative of one or more parameters sensed at a pipeline, analyze the data to determine whether an anomaly is present at the pipeline, cause a notification to be presented on the user interface indicating that the anomaly is present, and receive a request from the user for a corrective action be performed to address the anomaly that is determined to be present. The notification is a call field technician notification. The corrective action includes notifying maintenance personnel located remotely from the user and located locally to the pipeline of the anomaly.

In another embodiment, a detection method includes receiving at a processor, data indicative of one or more parameters sensed at a pipeline with one or more sensors, analyzing the data with the processor to determine whether an anomaly is present at the pipeline, and, in response to determining that the anomaly is present, causing a notification to be presented on a user interface indicating that the anomaly is present.

The detection method can have any number of variations. In certain embodiments, the anomaly can include one or more of a leak in the pipeline, an intrusion, strain, an acoustic event, and a rapid temperature change. In certain embodiments, the notification can be coded to uniquely identify to a user of the user interface the type of anomaly detected, and the type of anomaly can include one of a leak, an intrusion, strain, an acoustic event, and a rapid temperature change. In certain embodiments, the user interface can be displayed on a display of a client terminal, and the client terminal can include one of a desktop computer, a workstation, a minicomputer, a laptop computer, a tablet computer, and a smart mobile phone. In certain embodiments, the method can include receiving at the processor an acknowledgement of the notification from a user of the user interface, the method can include, in response to the receipt of the acknowledgement, causing detailed information regarding the anomaly to be shown on the user interface, and the detailed information can include one or more of a map showing a geographic location of the anomaly, audio at a location of the anomaly, a history of previously detected anomalies at the pipeline, identity of equipment along the pipeline adjacent to a location of the anomaly, and sensed parameter data for a period of time prior to a time of the anomaly's occurrence. The sensed parameter data can include at least one of acoustic data, temperature data, frequency data, strain data, and fluid flow rate data. In certain embodiments, the method can include receiving at the processor an input from a user operating the user interface, the input can request a corrective action be performed to address the anomaly that is determined to be present, and the corrective action can include at least one of notifying maintenance personnel remotely located from the user and located locally to the pipeline of the anomaly, and an instruction to cause remote adjustment of at least one device operatively coupled to the pipeline.

Non-transitory computer program products (e.g., physically embodied computer program products) are also provided that store instructions, which when executed by one or more data processors of one or more computing systems, cause at least one data processor to perform operations herein. Similarly, computer systems are also provided that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

BRIEF DESCRIPTION OF THE DRAWINGS

This disclosure will be more fully understood from the following detailed description taken in conjunction with the accompanying drawings, in which:

FIG. 9 illustrates an exemplary embodiment of a user page of a user interface of a pipeline management system;

FIG. 10 illustrates an exemplary embodiment of user registration window in the user page of a user interface of a pipeline management system;

FIG. 11 illustrates an exemplary embodiment of an edit window in the user page of a user interface of a pipeline management system;

FIG. 20 illustrates an exemplary embodiment of an operator view of a dashboard window of a user interface of a pipeline management system;

FIG. 21 illustrates an exemplary embodiment of a user interface log modal of a pipeline management system showing information associated with logging an event;

FIG. 23 illustrates an exemplary embodiment of an operator view with an expanded event card with map view of a dashboard window of a user interface of a pipeline management system;

FIG. 24 illustrates an exemplary embodiment of an expanded event card of a user interface of a pipeline management system with a custom schematic view;

FIG. 29 illustrates the context browser of FIG. 28 after selection of an item displayed thereon;

FIG. 30 illustrates an exemplary embodiment of an unacknowledged context for an alarm card in the user interface of FIG. 28;

FIG. 31 illustrates an exemplary embodiment of an acknowledged context for an alarm card in the user interface of FIG. 28;

FIG. 38 illustrates yet another exemplary embodiment of a map visualization of an alarm card;

FIG. 39 illustrates still another exemplary embodiment of a map visualization of an alarm card;

FIG. 41 illustrates an exemplary embodiment of a regular card showing logged alarm data;

FIG. 42B illustrates a bottom portion of the user interface of FIG. 42A;

FIG. 43 illustrates an exemplary embodiment of the user interface of FIG. 28 in full screen view;

FIG. 44 illustrates another exemplary embodiment of the user interface of FIG. 28 in full screen view;

Figure 1:
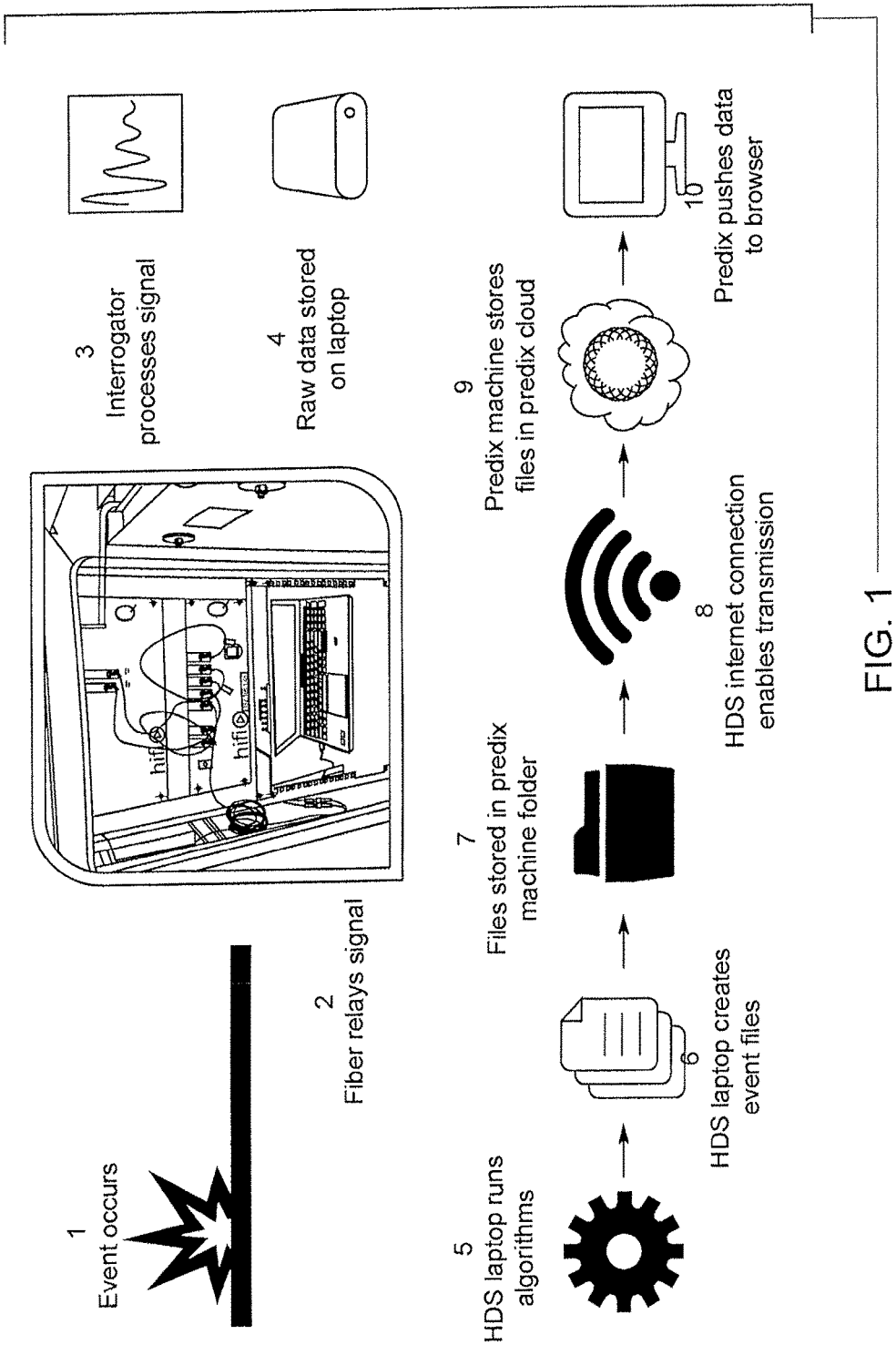
FIG. 1 is a schematic representation of an exemplary embodiment of a pipeline management system.

It is noted that the drawings are not necessarily to scale. The drawings are intended to depict only typical aspects of the subject matter disclosed herein, and therefore should not be considered as limiting the scope of the disclosure. In the drawings, like numbering represents like elements between the drawings.

DETAILED DESCRIPTION

The present disclosure relates generally to methods and systems for monitoring and reporting leaks in a pipeline, and in particular to leak detection user interfaces.

Certain exemplary embodiments will now be described to provide an overall understanding of the principles of the structure, function, manufacture, and use of the systems, devices, and methods disclosed herein. One or more examples of these embodiments are illustrated in the accompanying drawings.

A display screen can show information related to a pipeline through which a fluid flows, such as natural gas or petroleum. The pipeline can be continuously electronically monitored, and information on the display screen can clearly indicate when a possible problem with the pipeline is detected, such as a possible leak in the pipeline. A technician or other user looking at the display screen may therefore quickly and easily be notified of the possible problem and be able to take action to address the possible problem even if the technician/user is away or far away from the pipeline.

In general, a user interface for a pipeline management system can be configured to provide information regarding one or more pipelines to a user. The information can include data gathered using one or more sensors sensing various parameters, e.g., sensors placed along the pipeline and conveying sensed information to personnel monitoring the pipelines. The information on the user interface can include results of analysis of the gathered data, such as notifications that the gathered data indicates an anomaly with a pipeline. Examples of anomalies include leaks, intrusions, strain, acoustic events, and rapid temperature changes. The notifications of anomalies can be provided on the user interface in real time with the data analysis, which may allow the user monitoring the user interface to be quickly informed of the anomaly. Accordingly, the user can trigger one or more corrective actions such as notifying maintenance personnel local to a location of the identified anomaly, remotely controlling the pipeline with the anomaly to close valve(s) and/or other equipment to prevent fluid flow in the pipeline in the area of the detected anomaly, etc. The gathered information and the notifications of anomalies can be presented on the user interface in a manner that allows for quick viewing and understanding by the user, and that provides options for allowing the user to access more detailed information. The gathered information and the notifications of anomalies shown via the user interface can be arranged and presented in a manner tailored to a role of the user (e.g., a permission level of the logged-on user) such that different users with different roles are allowed to access different information, which may help users receive only data that is most relevant to their particular role in pipeline monitoring. As an example, different users may have access to information about different pipelines, which may help focus the user on particular a pipeline or pipelines. Some users may be allowed to remotely control a pipeline via the user interface (e.g., adjust a temperature control mechanism remotely, open/close a valve remotely, etc.), while other users may not be allowed to remotely control the pipeline via the user interface but may be allowed to contact maintenance personnel via the user interface to notify the maintenance personnel that the pipeline needs attention due to a detected anomaly. Some users may have both or more of the access listed above.

FIG. 1 is a schematic representation of an exemplary embodiment of a pipeline management system that includes a user interface configured to facilitate user monitoring and management of at least one pipeline. When an event (e.g., leaks, intrusions, strain, acoustic events, and rapid temperature changes in the pipelines) occurs, a fiber optic cable typically conveys a signal to a client terminal (e.g., desktop computer, workstation minicomputer, laptop computer, tablet computer, personal digital assistant, smart mobile phone, smart watch, etc.) where the signal can be processed and raw data associated with the event signal stored. Event files can be generated from the raw data and the files can be stored in a folder, such as an operating system machine folder (e.g., a Predix™ operating system machine folder), and transmitted to a cloud folder, such as a Predix™ operating system cloud folder, for cloud storage at an internet cloud platform such as a service (PaaS) based system such as the Predix™ operating system. Data associated with the event files can be pushed to a user interface of the client terminal for display to the user. The system can convey sensed data to the client terminal continuously, in real time. In this way, the system will transmit data when the event occurs. The continuous transmission of data can include a series of closely-timed, scheduled transmissions, such as four seconds of data being transmitted every four seconds.

Figure 2:
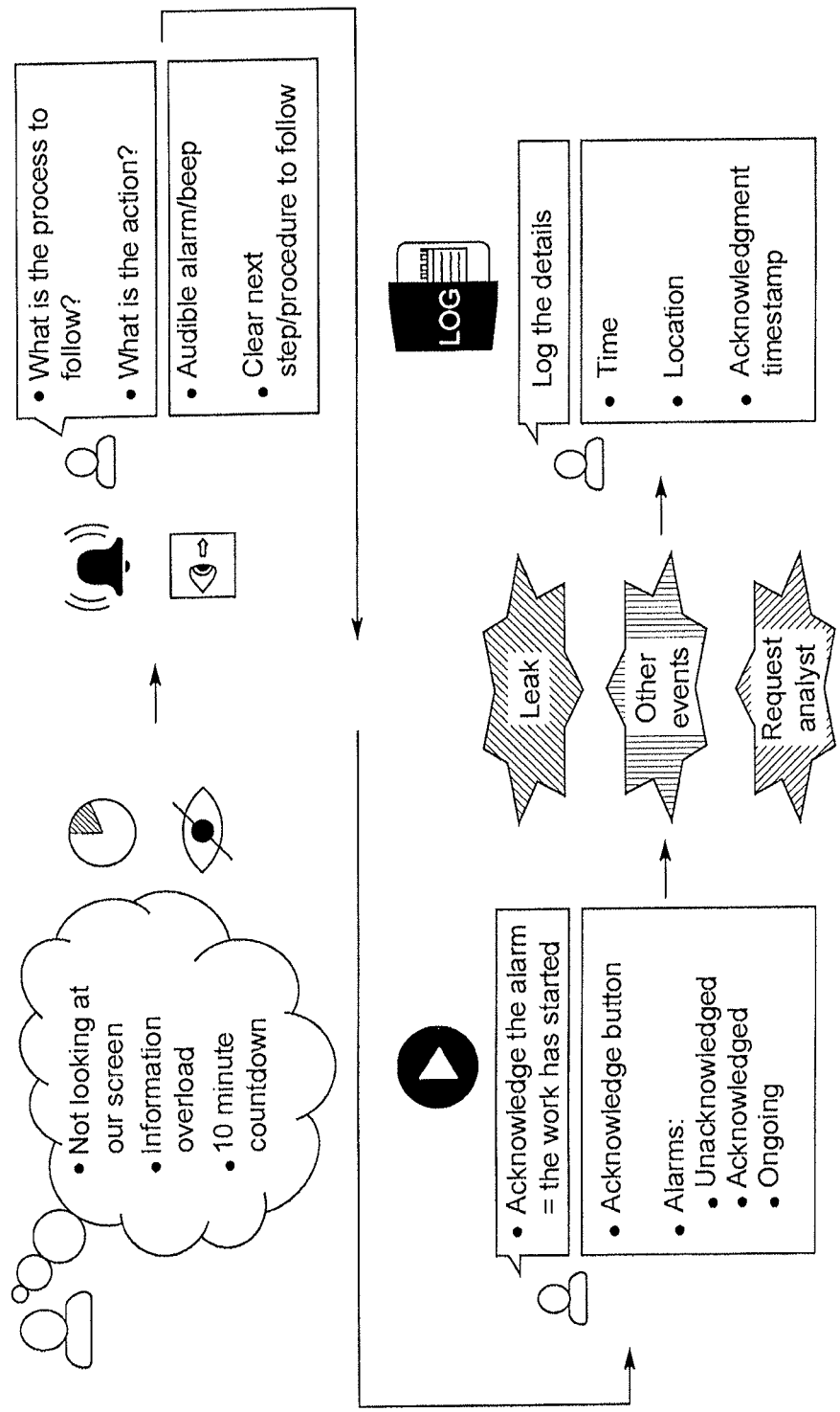
FIG. 2 is a schematic representation of an exemplary embodiment of a presentation of alarm signal and detection of user response through a user interface of a pipeline management system.

FIG. 2 illustrates an exemplary embodiment of a presentation of an alarm signal and the detection of a user response through a user interface of a pipeline management system. A user monitoring a user interface may not be able to respond quickly to an anomalous event due to any one or more various reasons, such as information overload or time lag in noticing the event's occurrence. Embodiments of user interfaces described herein may present an alarm signal associated with an anomalous event to the user, such as through an audible alarm beep and/or a discernable visual display of alarm signal. The user interface can allow the user to acknowledge the alarm via the user interface and can then, in response to the acknowledgement, present to the user via the user interface guidelines to respond efficiently by either performing an action or by requesting another person (maintenance personnel, another user of the user interface with higher access rights that the user, etc.) to respond to the alarm. The user interface can also allow the user to input details of the steps taken to resolve the anomalous event in an event log that can be stored in a database operatively coupled to the user interface. The user interface may thereby help prevent problems arising from a user's inability to respond quickly to an anomalous event.

A user interface of a pipeline management system can include a context browser, a prevent page (also referred to herein as an "analyze page"), and a user page. FIGS. 3-11 illustrate various exemplary embodiments of the context browser, the analyze page, and the user page. The context browser can allow the user to navigate through the context of alarms representing anomalous events in one or more pipelines. The analyze page can present data related to the anomalous events to the user. The user page can allow management of a user database associated with the user interface. Through the user page, new users can be registered and their access rights or credentials (e.g., operator, analyst, administrator, etc.) recorded by a logged-in user with a permission level permitting such editing. At least some embodiments of the user interface can include an information bar, which may be located horizontally near a top of the user interface. The information bar can display information of pipelines under observation (e.g., owner company of the pipeline, identification number, etc.), credentials of the user of the user interface (e.g., operator, analyst, administrator, etc.), and the operation being performed (e.g., monitoring or analyzing the anomaly event, user data management, etc.).

Figure 3:
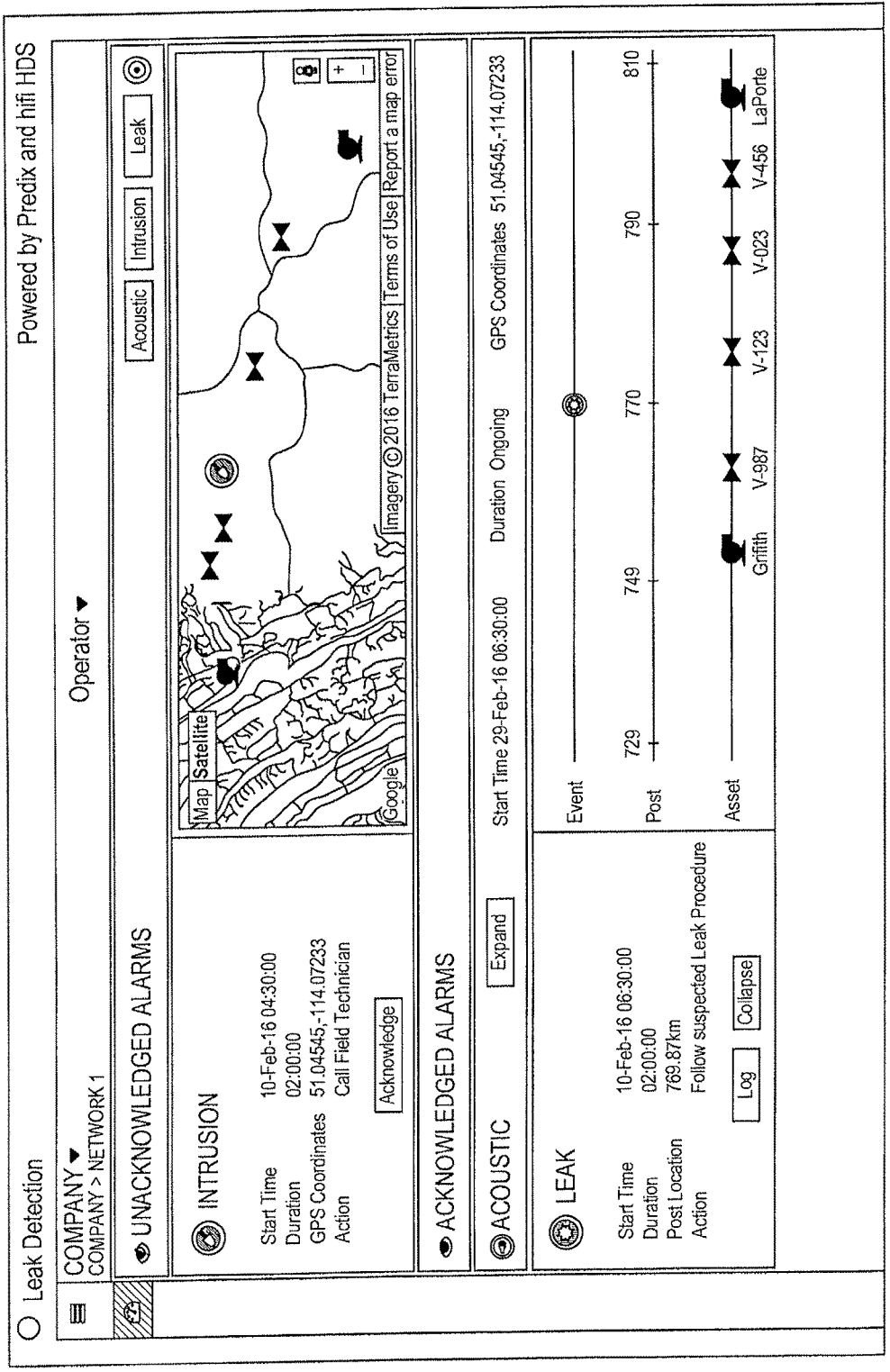
FIG. 3 illustrates an exemplary embodiment of a monitor dashboard of a user interface of a pipeline management system, the dashboard including unacknowledged alarms.
Figure 4:
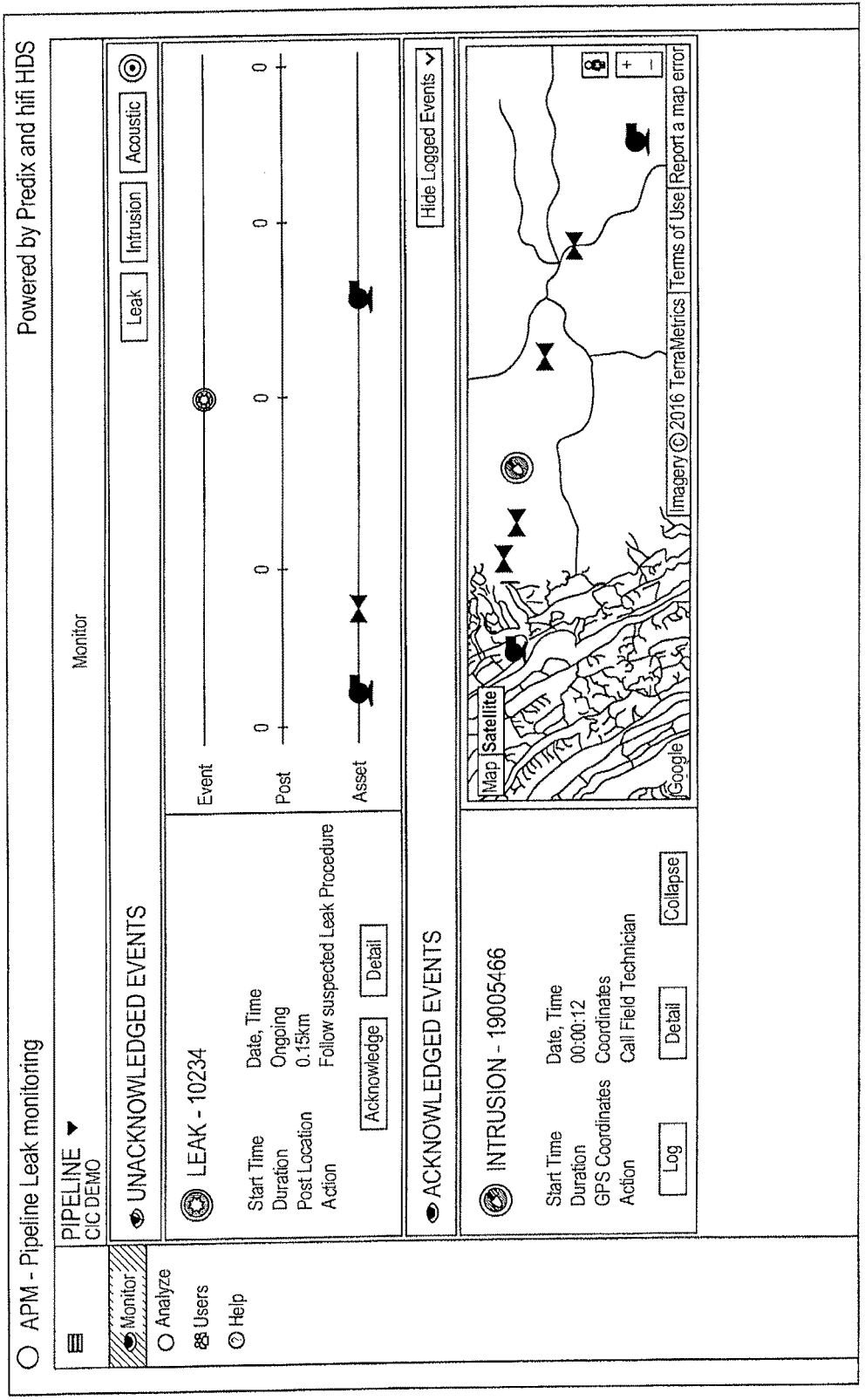
FIG. 4 illustrates another exemplary embodiment of a monitor dashboard of a user interface of a pipeline management system, the dashboard including acknowledged alarms.
Figure 5:
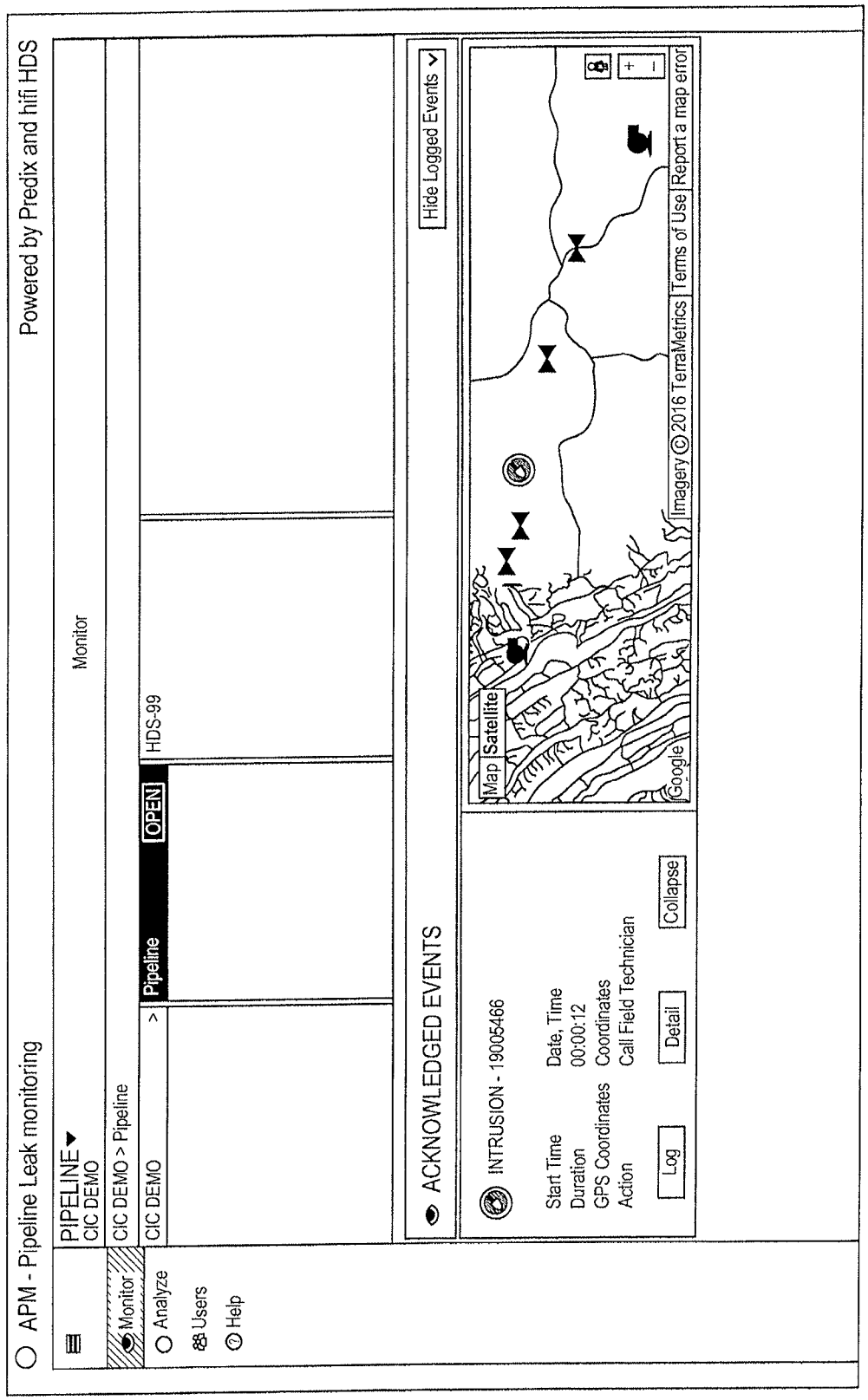
FIG. 5 illustrates an exemplary embodiment of a context browser of a user interface of a pipeline management system that displays information of a pipeline under observation.

The user interface can also include a menu or side bar that can be selectively minimized (as shown in FIG. 3) to hide tabs, and that can be expanded (as shown in FIG. 4) to display the tabs that allow the user to navigate among the context browser, the analyze page, and the user page.

FIG. 4 illustrates an exemplary embodiment of the context browser of the user interface. The context browser can be accessed by clicking a "Monitor" tab located in the user interface's side bar. When an anomalous event occurs, a notification can be shown on the context browser. The anomalous event at a pipeline can be determined to have occurred in any of a variety of ways, such as analysis of data sensed by sensor(s) positioned along the pipeline, e.g., fiber optic sensing technology operatively coupled to the pipeline along the length of the pipeline. The context browser can present the nature of the anomalous event (e.g., leak, intrusion, acoustic event, etc.), information associated with the anomalous event (e.g., start time, duration, geographic location of the event, etc.) and assets (e.g., oil wells, pipelines, etc.) that are located in the vicinity of the event (e.g., at least one asset along the pipeline immediately to each of the left and right of a location of the event along the pipeline). The notification can indicate a recommended action for the user to perform, such as a call field technician notification indicating to the user that a field technician (and/or other maintenance personnel) should be contacted to address the anomalous event. The context browser can also or alternatively present the geographic location of the event and/or assets in the vicinity of the event overlaid on an interactive map or a satellite image obtained from, e.g., an online database such as Google Maps™. The user can interact with the map by clicking on the map, as will be appreciated by a person skilled in the art. As an example, the user can zoom in or zoom out of the map. The nature or type of the event can be displayed in the context browser by assigning unique symbols to different anomalous events, such as color-coded icons and/or different symbols (e.g., a red star icon for a leak and a yellow arrow icon for an intrusion). Additionally, or alternately, a schematic view of the event without the map can be displayed that shows the nature of the event, geographic location of the event, and/or and the nearby assets. In at least some embodiments, the user can toggle between the schematic view and the map view.

The context browser can present a status of the event indicating whether the event has been acknowledged by the user ("Acknowledged event") or not ("Unacknowledged Event"). A user can acknowledge the event by clicking on the acknowledge tab, which changes the status of the event, for example, from "Unacknowledged" to "Acknowledged" to thereby indicate to the user and to other users of the user interface that the event has been noticed by a user who may initiate a response (e.g., corrective action) to the event. Once an event has been acknowledged, the user may choose to minimize information associated with the event by clicking on a "collapse" tab.

Once an event has been acknowledged, the system can be configured to provide the user with a way to contact the field technician (and/or other maintenance personnel) and/or to automatically trigger a corrective action to address the anomalous event. As an example, when the notification is a call field technician notification, the user's acknowledgement can be configured to show on the user interface contact information for one or more maintenance personnel located remotely from the user and located locally to the pipeline of the anomaly. The one or more maintenance personnel's local location can be determined in any of a variety of ways, such as by identifying personnel within a predetermined distance of a location of the anomalous event (e.g., within five miles of the event, within fifty miles of the event, within a day's drive of the event, etc.), determining which one or more of pre-identified personnel are closest to the location of the event, etc. A person's location can be determined in any of a variety of ways, such as by a last reported location personally input to the system by the personnel or by global positioning system (GPS) or cell phone location information that is automatically input to or otherwise accessible to the system. The call field technician contact information can include any of a variety of types of information, such as a phone number or email address. As another example, when the notification is a call field technician notification, the user's acknowledgement of the anomalous event can be configured to automatically trigger a corrective action of notifying maintenance personnel located remotely from the user and located locally to the pipeline of the anomaly. One or more maintenance personnel can be notified. The one or more maintenance personnel can be selected by the system based on geographic proximity, which can be determined in any of a variety of ways, as discussed above. The notification to the maintenance personnel can be provided in any of a variety of ways, such as any one or more of a text message, a phone call, and an email.

Figure 6:
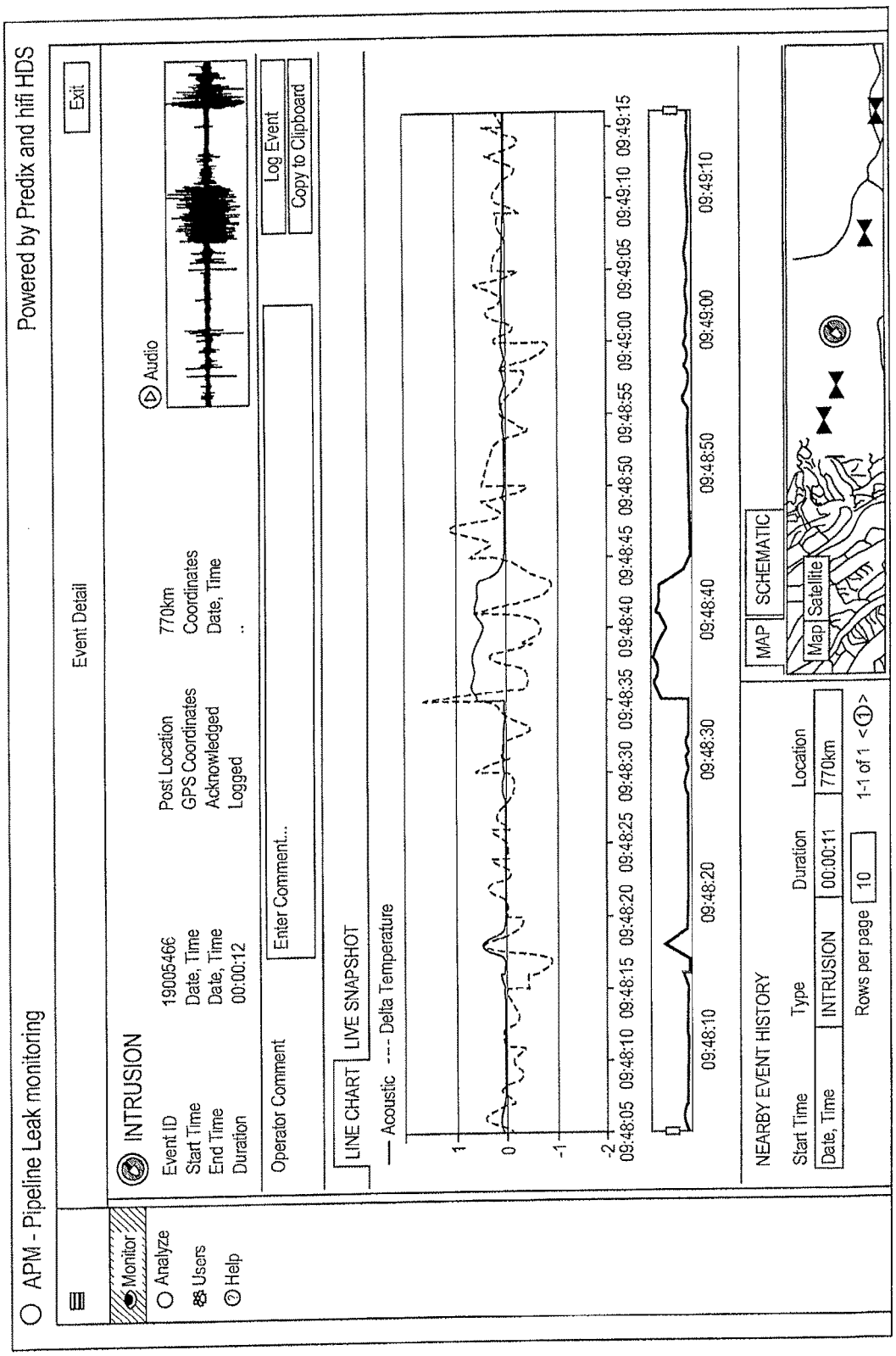
FIG. 6 illustrates an exemplary embodiment of an event detail page of a user interface of a pipeline management system displaying a line chart window associated with an anomalous event and including a two-dimensional (2D) graph.

The user can access detailed information associated with the acknowledged event by clicking on a "details" tab. This can open up an "Event Detail" window, as shown in FIG. 6. The "Event Detail" window can include GPS coordinates of the event, time when the event was acknowledged, duration of the event, and/or a live audio signal from the geographic location of the event. The window can also include comments from other users (e.g., a user who has worked on this event before, an expert analyst, etc.), and it can allow the current user to edit or add comments.

Figure 7:
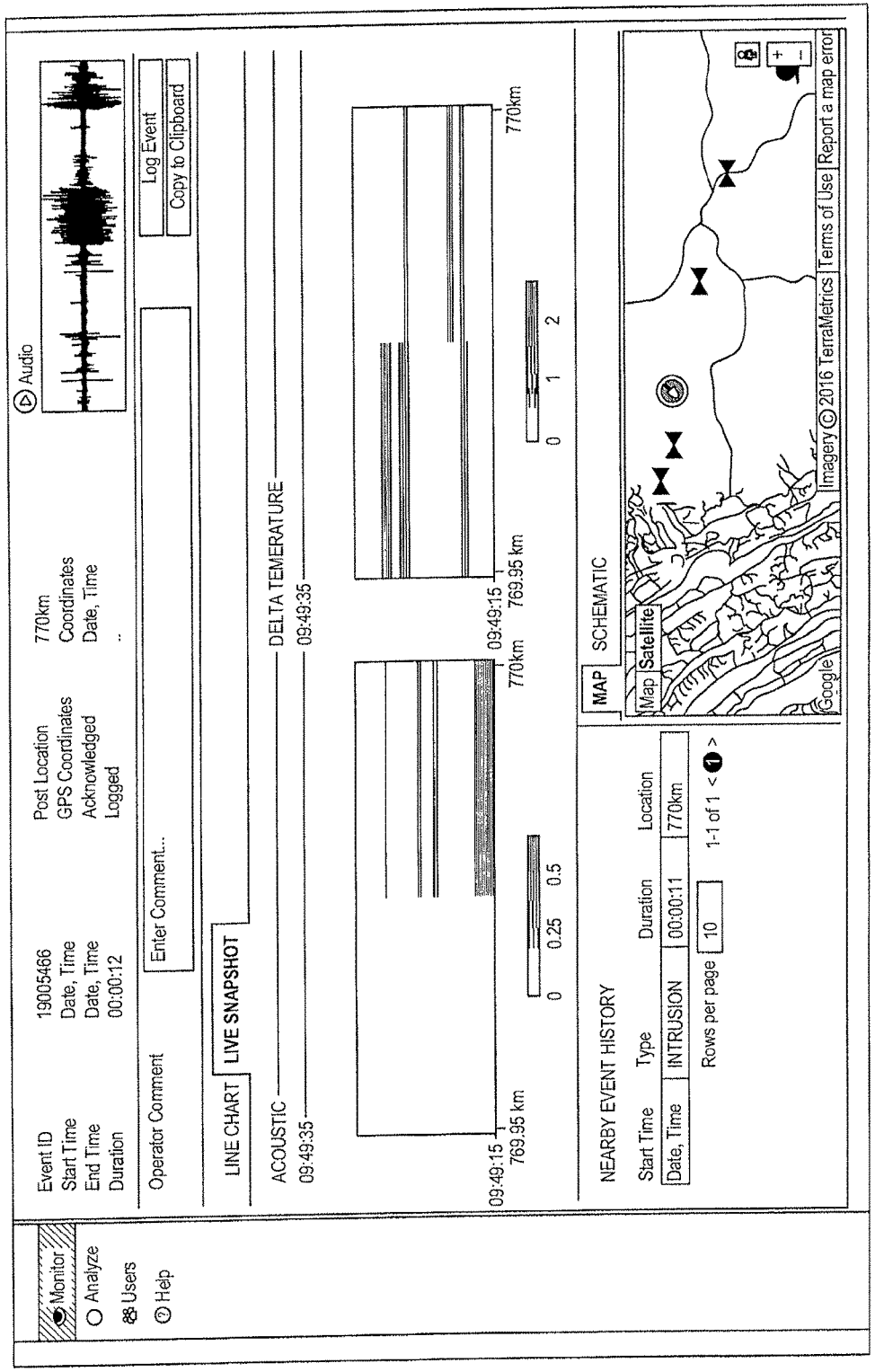
FIG. 7 illustrates an exemplary embodiment of an event detail page of a user interface of a pipeline management system displaying a live snapshot window associated with an anomalous event and including a three-dimensional (3D) graph.

The user can access historical data associated with the anomalous event, such as through a line chart. FIG. 6 illustrates an exemplary embodiment of the line chart that shows acoustic and temperature information history associated with a detected intrusion event. The user can also access real time data from the event site. As an example, as shown in FIG. 7, the user can access real time acoustic and temperature information, which may be transmitted to the user interface via an operating system platform, such as the Predix™ operating system platform, through a "Live Snapshot" window. The real time data can be refreshed according to a predetermined schedule, such as every four seconds. The user can also access event histories of assets located in the geographic location of the anomalous event. The user can exit "Event Details" by clicking on the "exit" tab.

Figure 8:
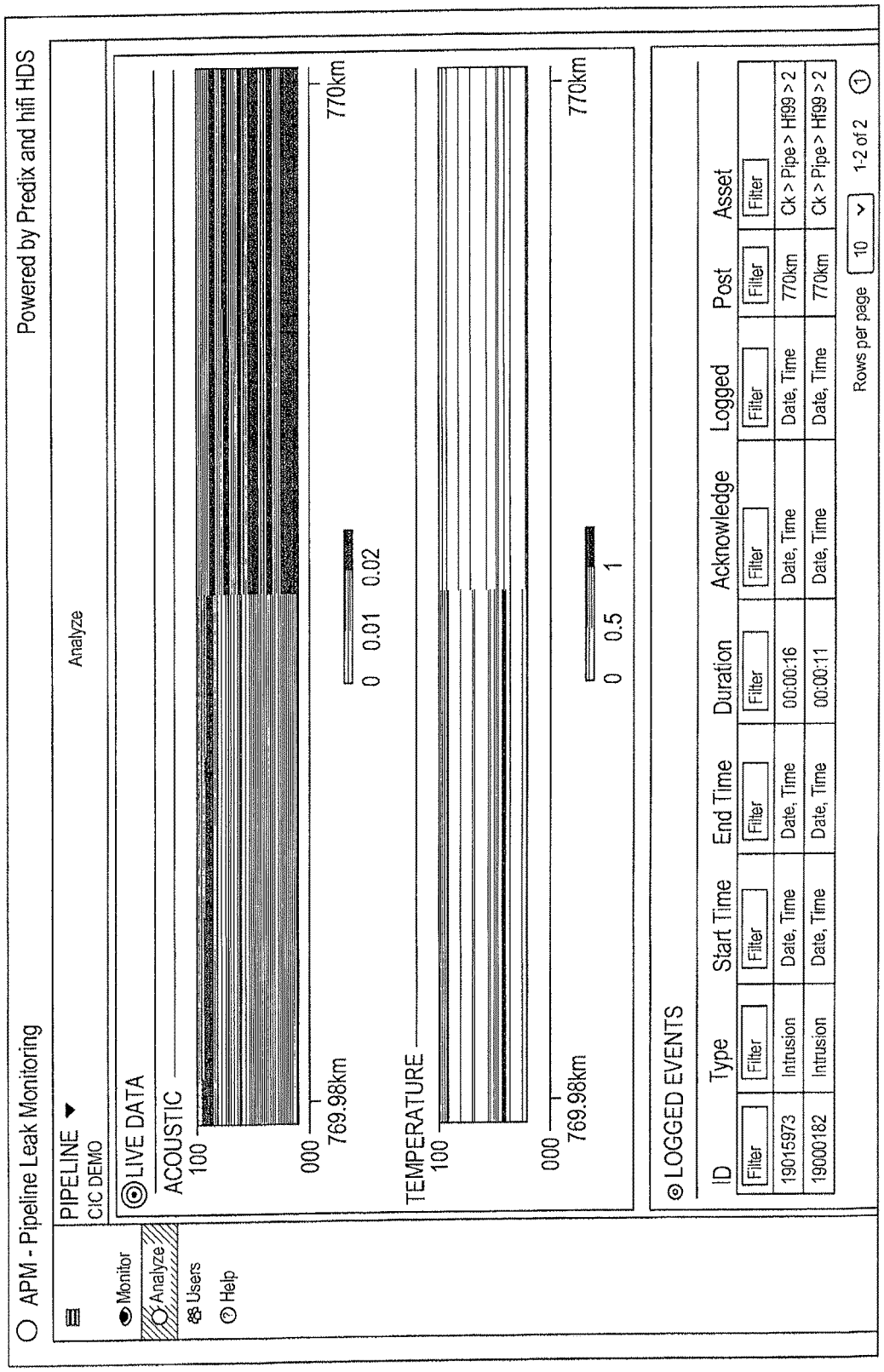
FIG. 8 illustrates an exemplary embodiment of an analyze page of a user interface of a pipeline management system.

As illustrated in FIG. 8, the user can access data that may be needed for user analysis of the anomalous event and/or analysis of data that may have been performed by a processor by clicking on an "Analyze" tab in the side bar. This can open the prevent page ("Analyze" window) where the user can access live data (e.g., acoustic data, temperature data, etc.), which may be transmitted to the user interface via an operating system platform, such as the Predix™ operating system platform, from one or more sensors positioned along the pipeline that experienced the anomalous event. Additionally, live data from multiple sites (e.g., other pipelines) can also be presented on the user interface. Further, information associated with other detected anomalous events can be shown, such as historical events that have been recorded in an event log stored in a database.

The user can manage the user database by clicking on a "User" tab in the side bar. The user clicking on the "User" tab opens a user window, shown in FIG. 9, which displays a user identification (ID) code, name, email, company, and role of the users who have been granted access to at least a portion of the user interface. Additionally, as mentioned above, a new user can be registered in the user database through a registration window (see FIG. 10) and/or information associated with a registered user can be edited through an edit window (see FIG. 11).

Figure 12:
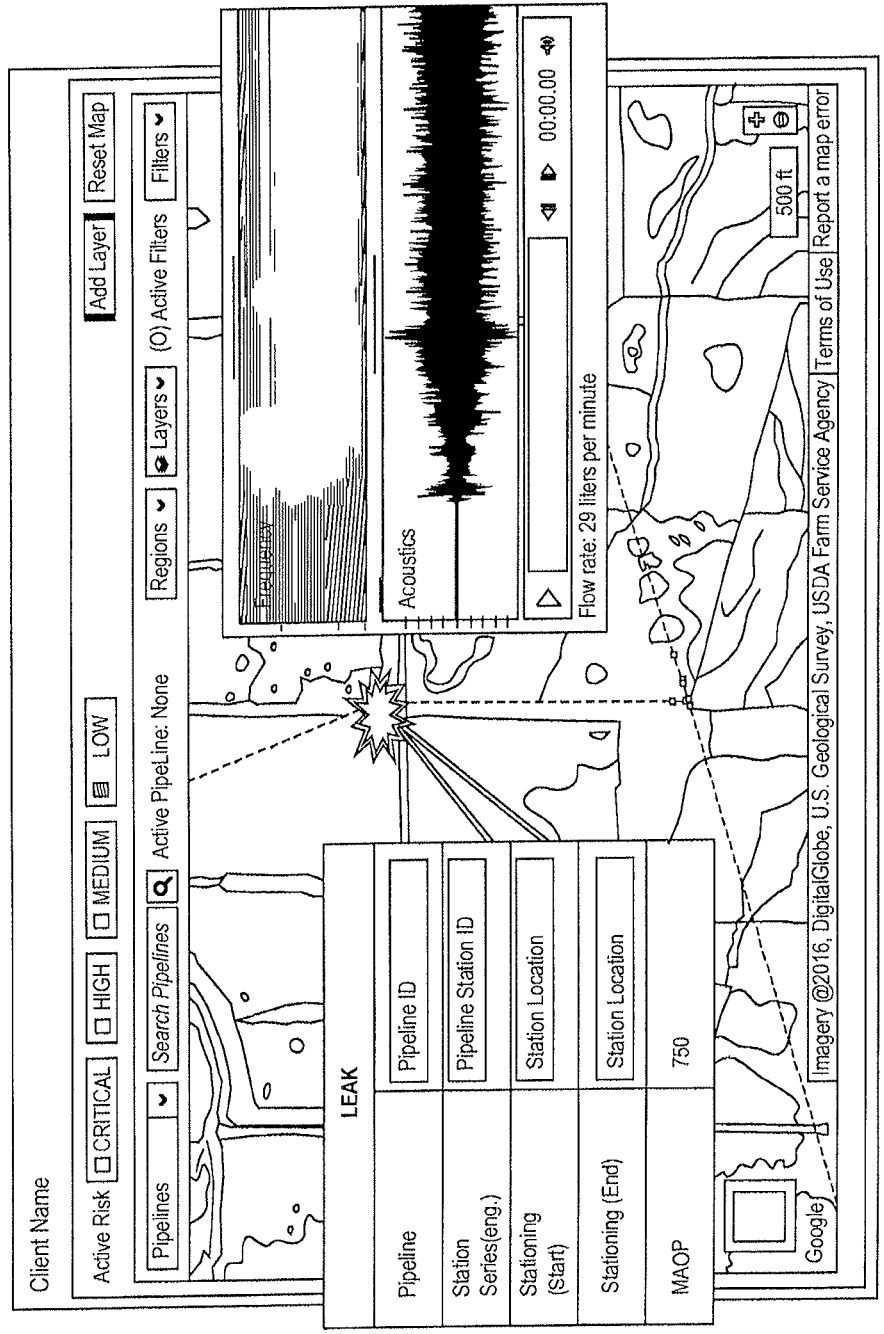
FIG. 12 illustrates an exemplary embodiment of a window of a user interface of a pipeline management system displaying information associated with an anomalous event.
Figure 13:
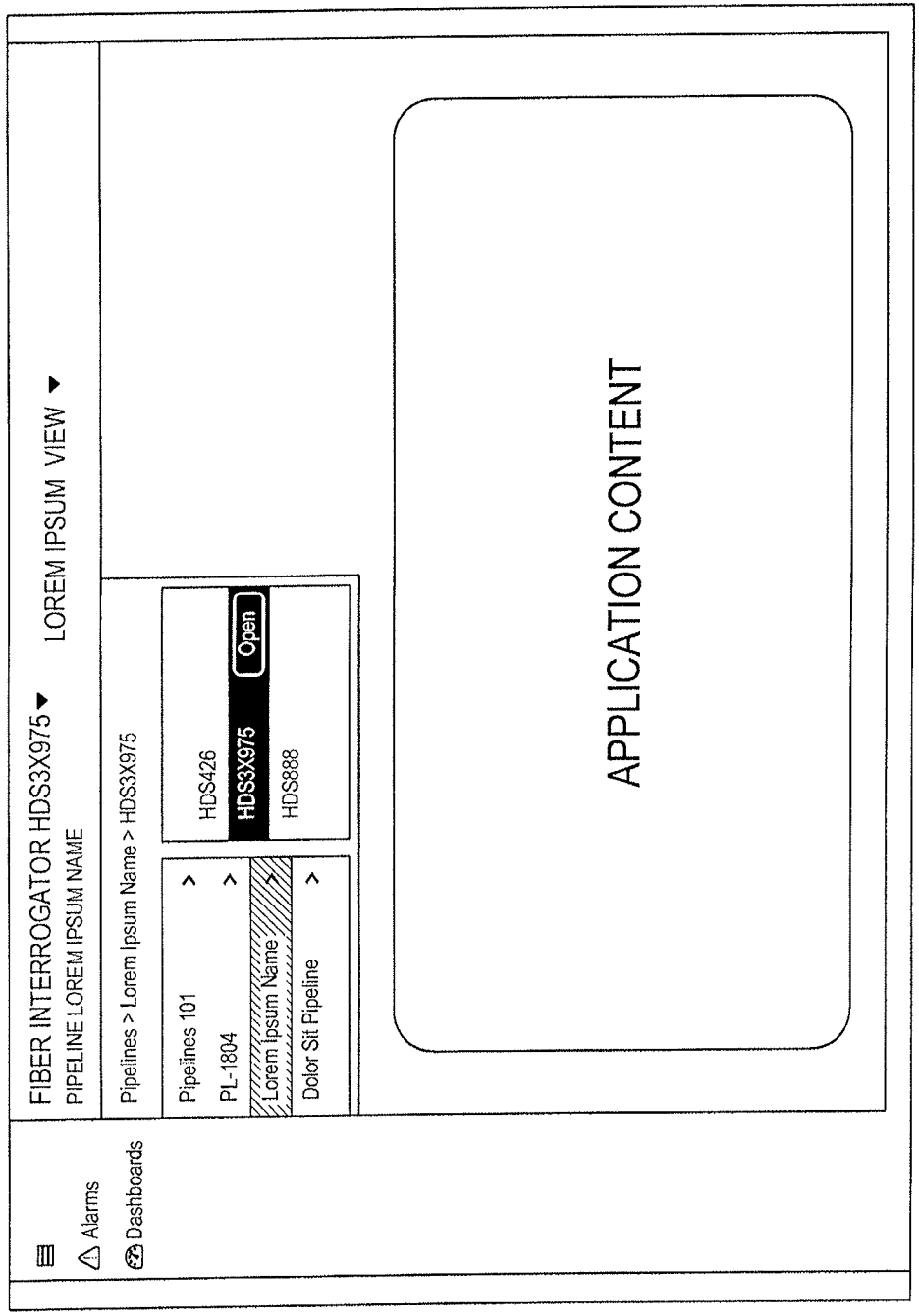
FIG. 13 illustrates an exemplary embodiment of a context browser of a user interface of a pipeline management system.

FIG. 12 illustrates an exemplary embodiment of a user interface including a window showing a geographic location of a detected pipeline anomaly on a map, along with information (including pipeline identification, station series, beginning and end of stationing) associated with the event. Additionally, acoustic information, frequency spectrogram information, pipeline fluid flow information, and the level of risk (e.g., critical, high, medium, low, etc.) associated with the event can also be displayed. The geographic location of the event can be overlaid on an interactive map.

Figure 14:
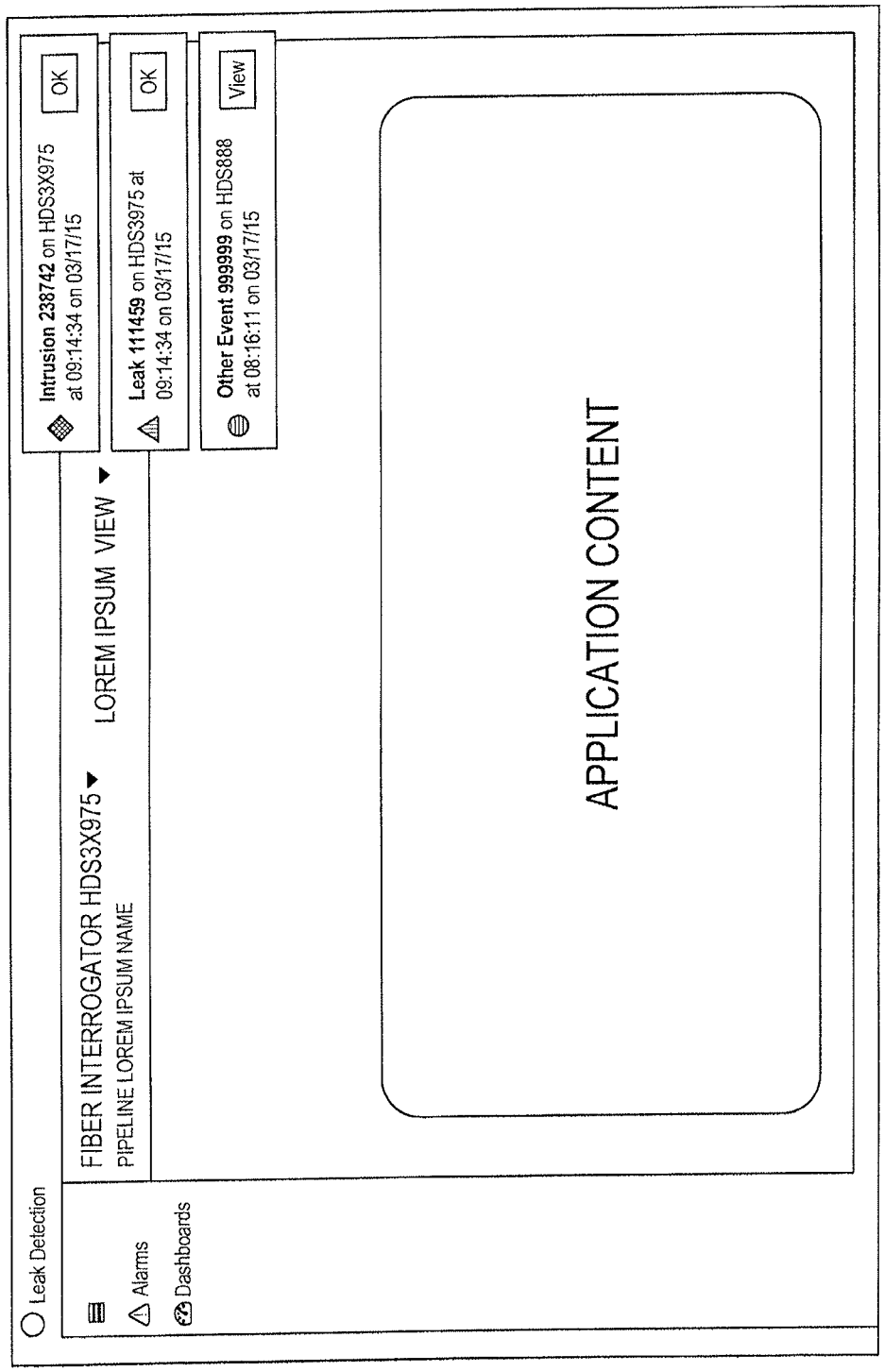
FIG. 14 illustrates an exemplary embodiment of a user interface of a pipeline management system with alarm signals and notifications.

FIGS. 13-23 illustrate an exemplary embodiment of a user interface with a full screen modal view. The user interface can include a "Dashboards" tab and an "Alarms" tab located in the side bar. An information bar can identify the pipeline being managed and observed via the user interface. A user can navigate through and access information related to one or more other pipelines managed by the pipeline management system associated with the user interface (see FIG. 13). As illustrated in FIG. 14, when an anomalous event occurs, a window can pop up alerting the user. The pop up window can display the nature of the event and the pipeline associated with the event. The pop up window can allow the user to acknowledge an event (e.g., by clicking on "OK") or, once acknowledged, access details of the event (e.g., by clicking "View").

Figure 15:
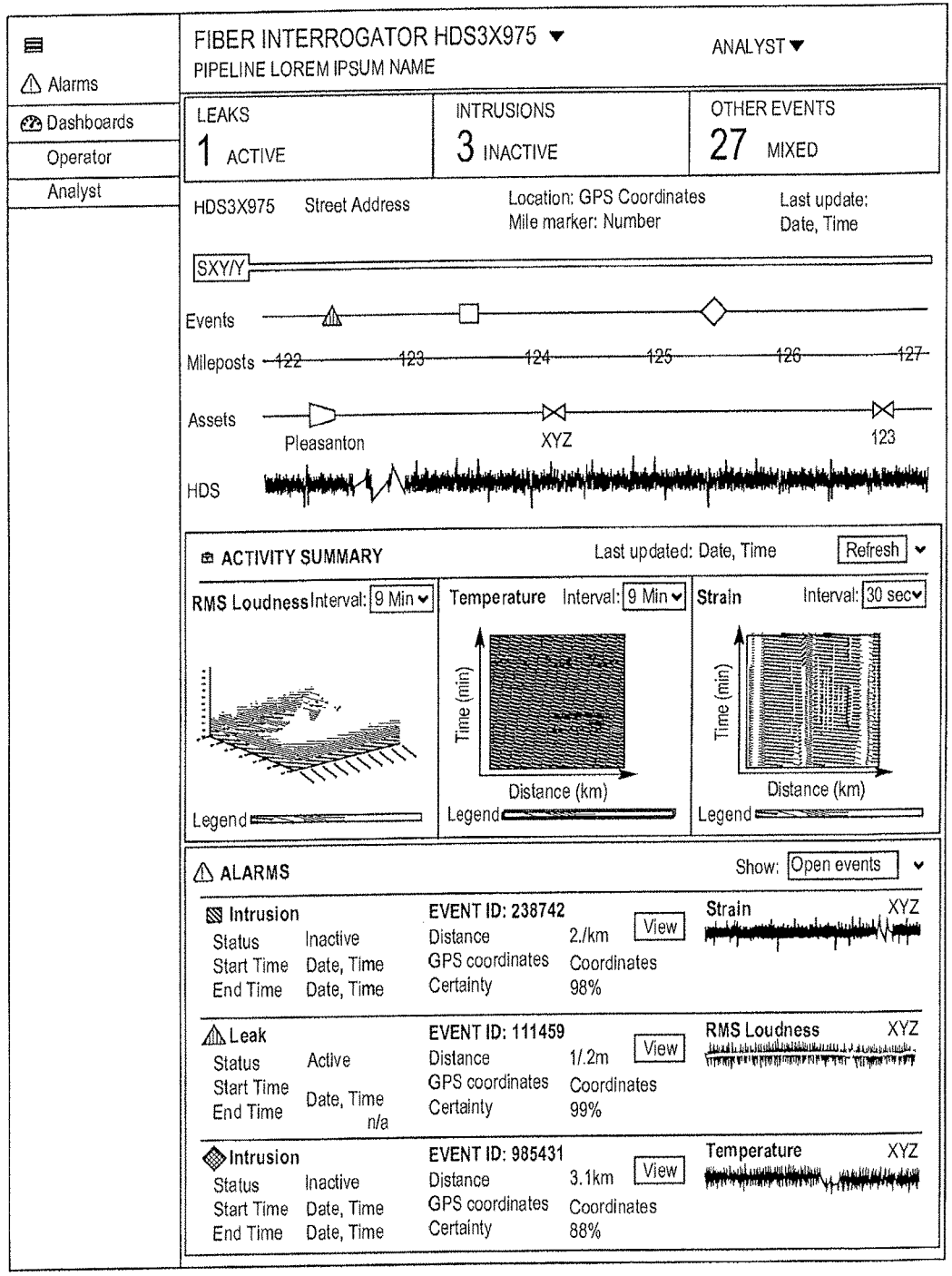
FIG. 15 illustrates an exemplary embodiment of an analyst view of a dashboard window of a user interface of a pipeline management system.
Figure 16:
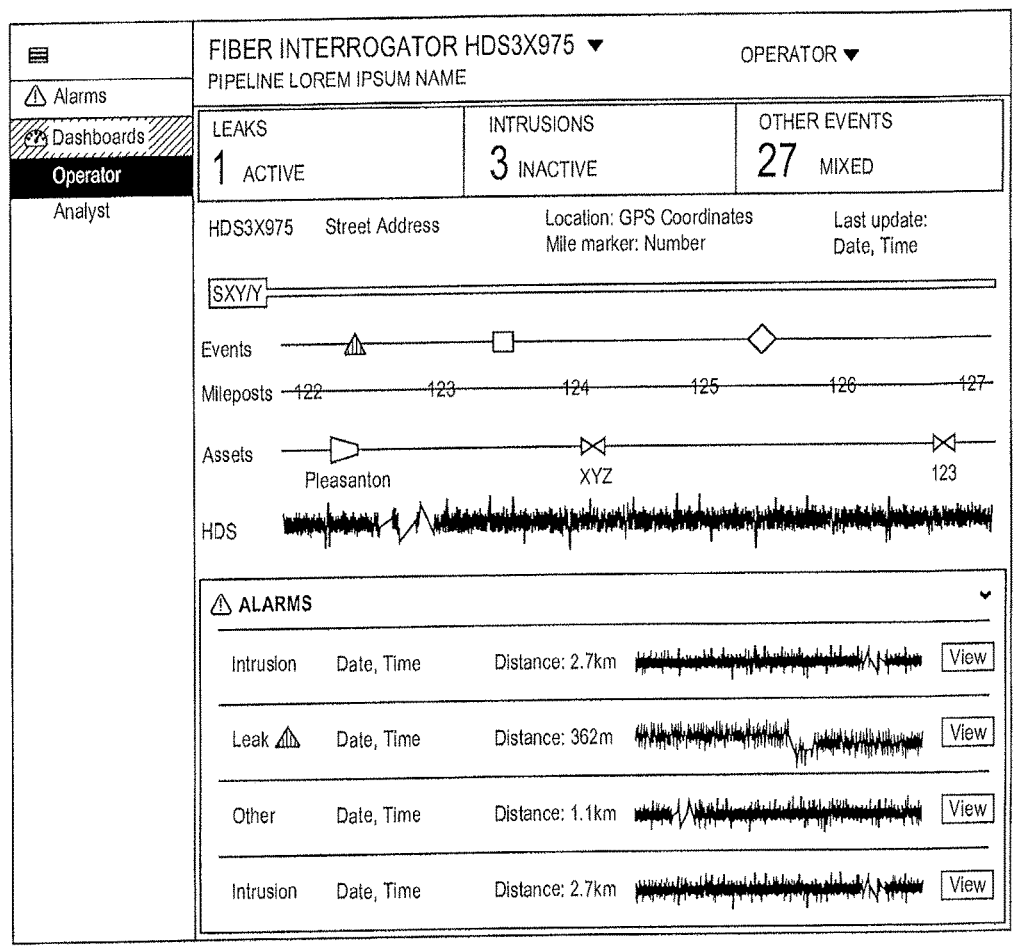
FIG. 16 illustrates an exemplary embodiment of an operator view of a dashboard window of a user interface of a pipeline management system.

The Dashboards tab can include an "Analyst" tab that, upon user selection, can display an analyst view of a dashboard window (FIG. 15). As shown in FIG. 15, a user can view details of an anomalous event, which may be transmitted to the user interface via an operating system platform such as the Predix™ operating system platform, such as root mean square (RMS) loudness, temperature, and strain. This information can be displayed as a 3D graph or a waterfall graph. Another user may not want to view the details of each anomalous event and may instead want to view the status of various anomalous events simultaneously. The Dashboards tab can also include an "Operator" tab that can display upon selection an operator view of the dashboard window (FIG. 16). FIG. 16 illustrates the operator view that can display succinct information regarding the multiple anomalous events. The user can access detailed information associated with each event by clicking on the "View" tab of the event.

Figure 17A:
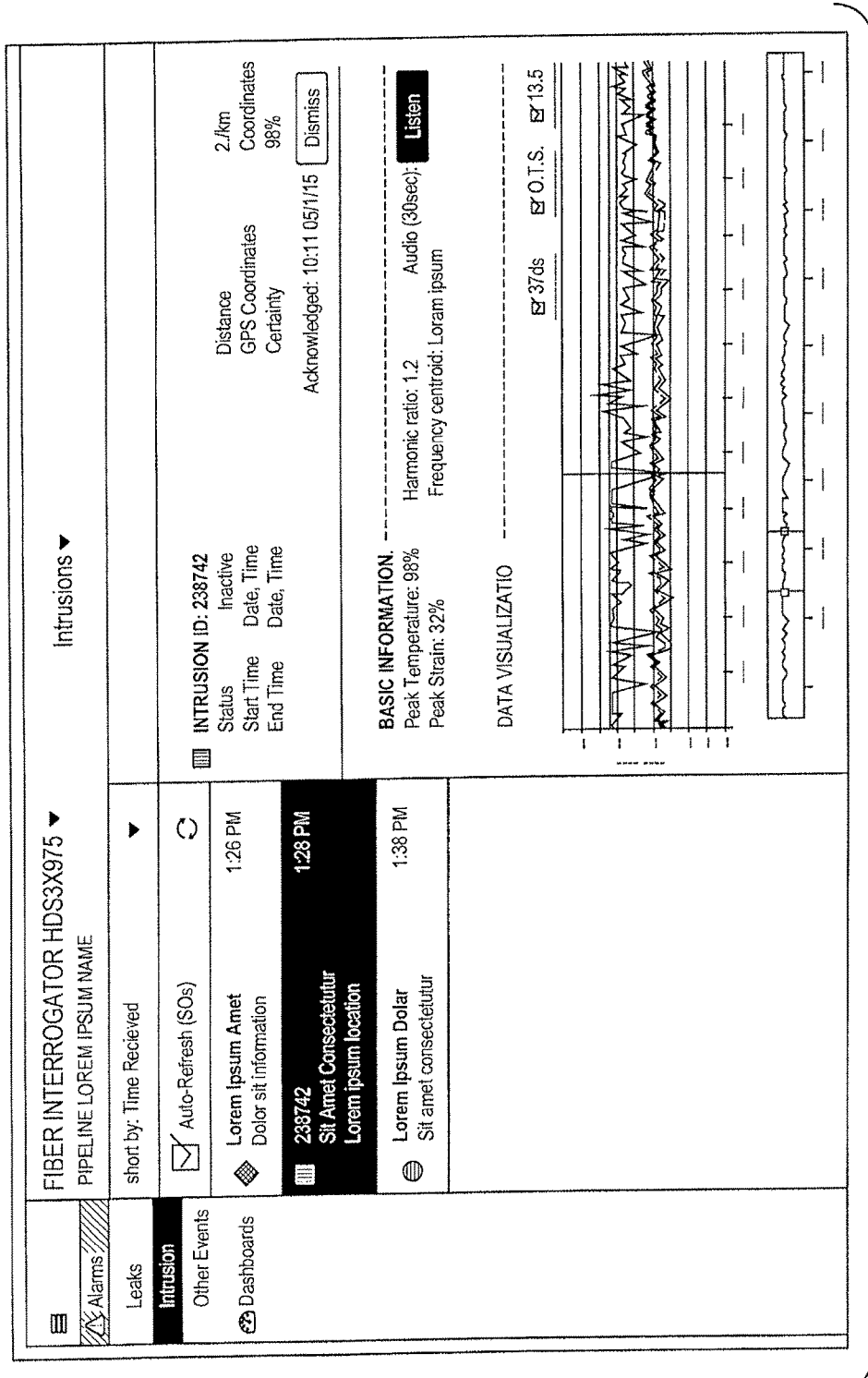
FIG. 17A illustrates a top portion of an exemplary embodiment of an alarm window of a user interface of a pipeline management system.
Figure 17B:
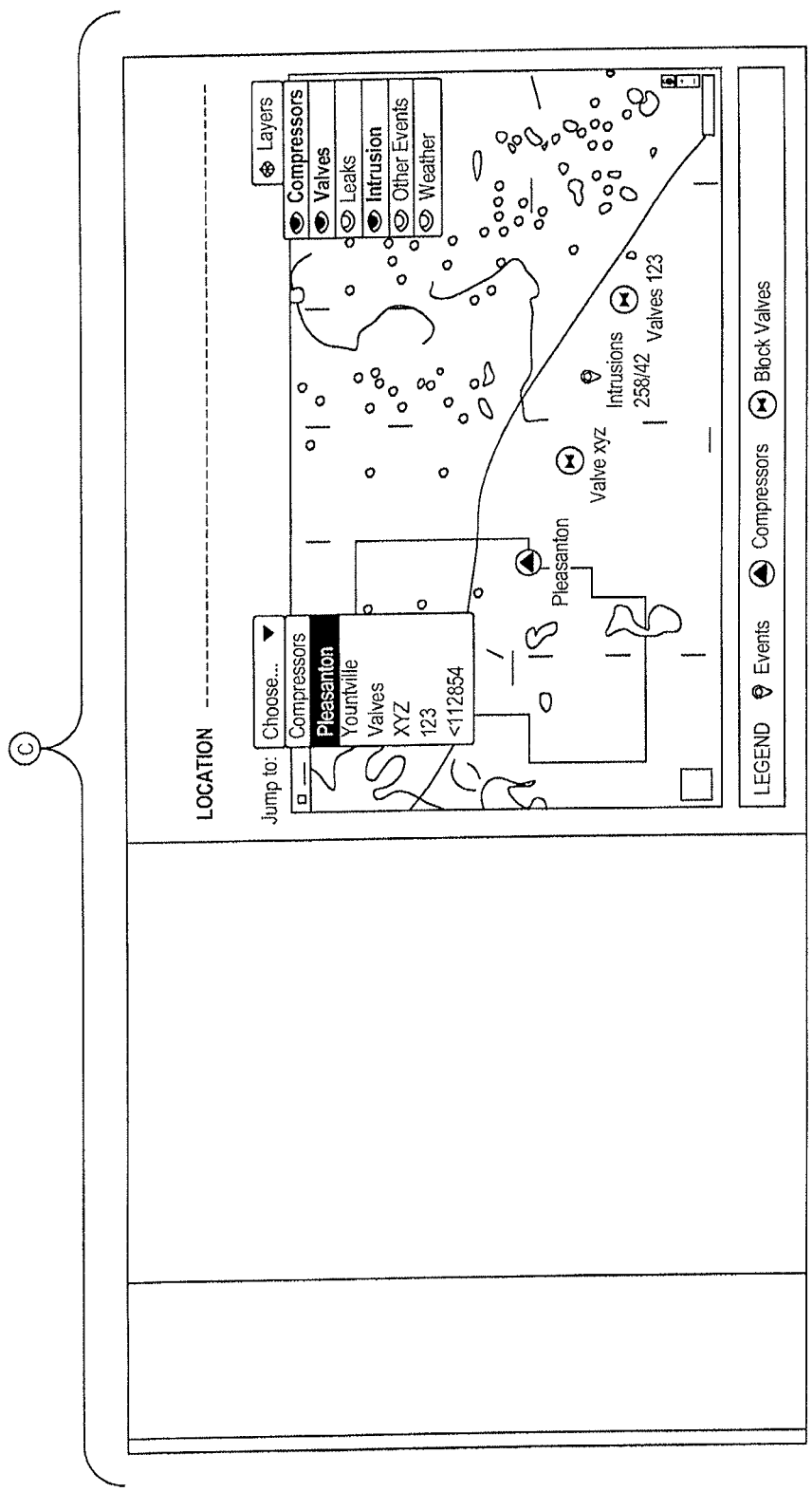
FIG. 17B illustrates a bottom portion of the alarm window of FIG. 17A.
Figure 18:
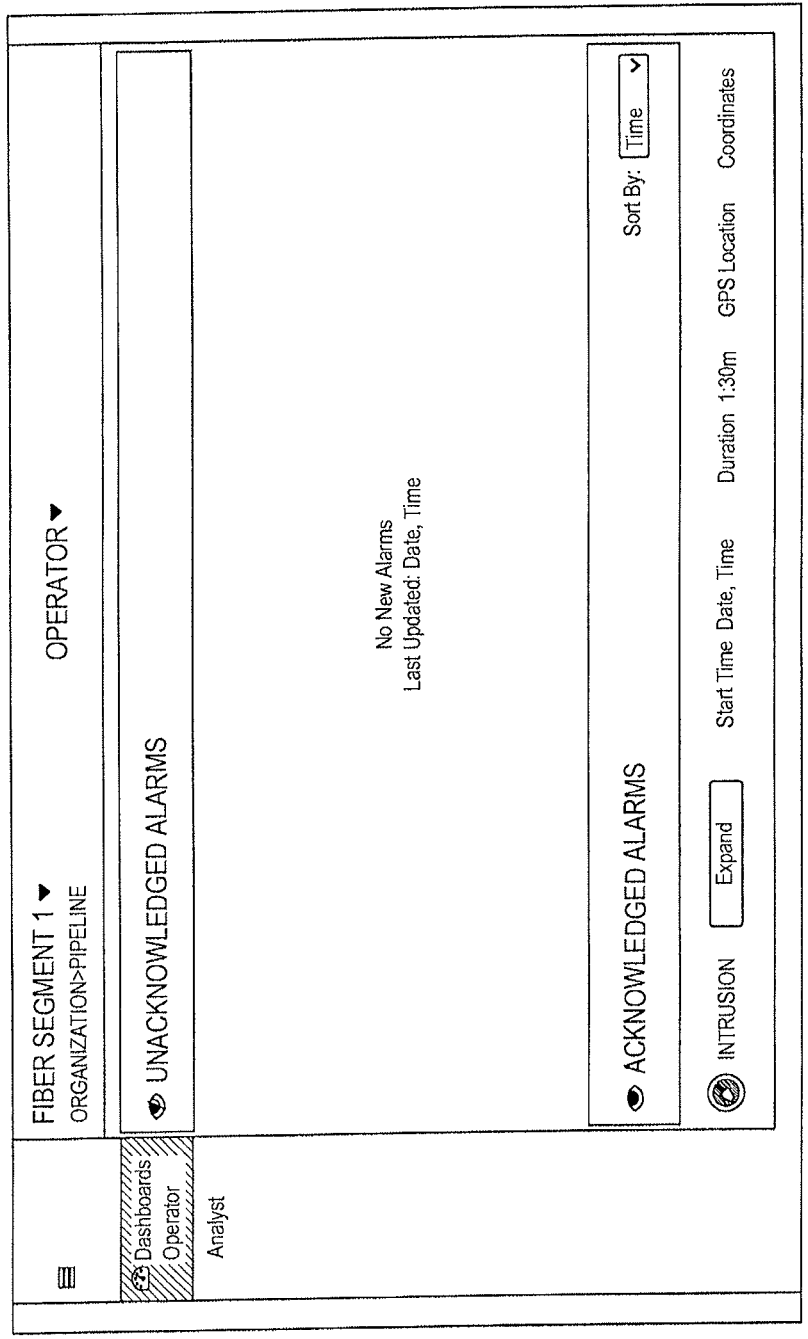
FIG. 18 illustrates an exemplary embodiment of an operator view of a dashboard window of a user interface of a pipeline management system.
Figure 19:
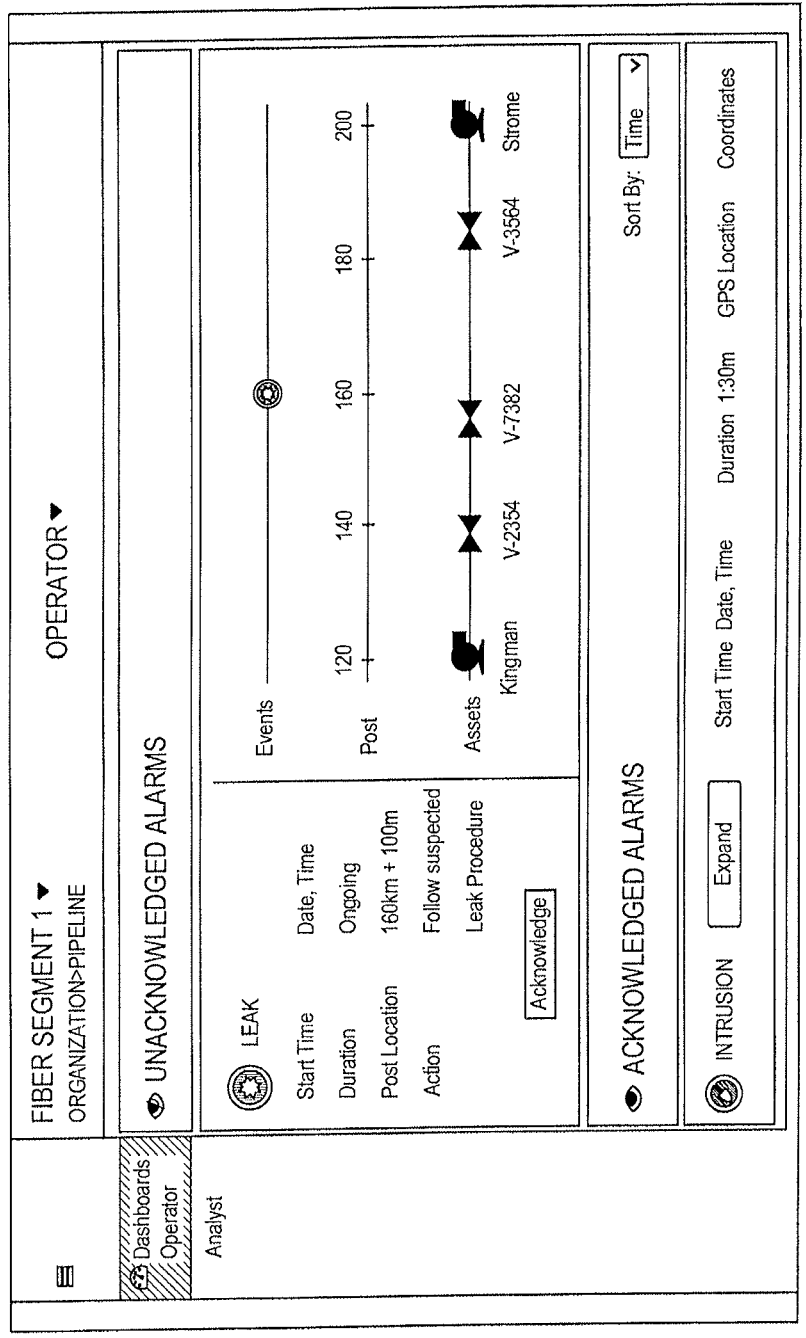
FIG. 19 illustrates an exemplary embodiment of an operator view of a dashboard window of a user interface of a pipeline management system.
Figure 22:
FIG. 22 illustrates an exemplary embodiment of an operator view of a dashboard window of a user interface of a pipeline management system.

The Alarms tab can allow a user to view an alarm window that can display alarm signals of multiple anomalous events. As shown in FIGS. 17A and 17B, various alarm signal tabs can be displayed. The user can access details of each of the anomalous events by clicking on the desired alarm signal tab. As an example, by clicking on the alarm signal tab that indicates "Intrusion," the user can access the status, start time, end time, location, and GPS coordinates associated with the event.

Figure 21:
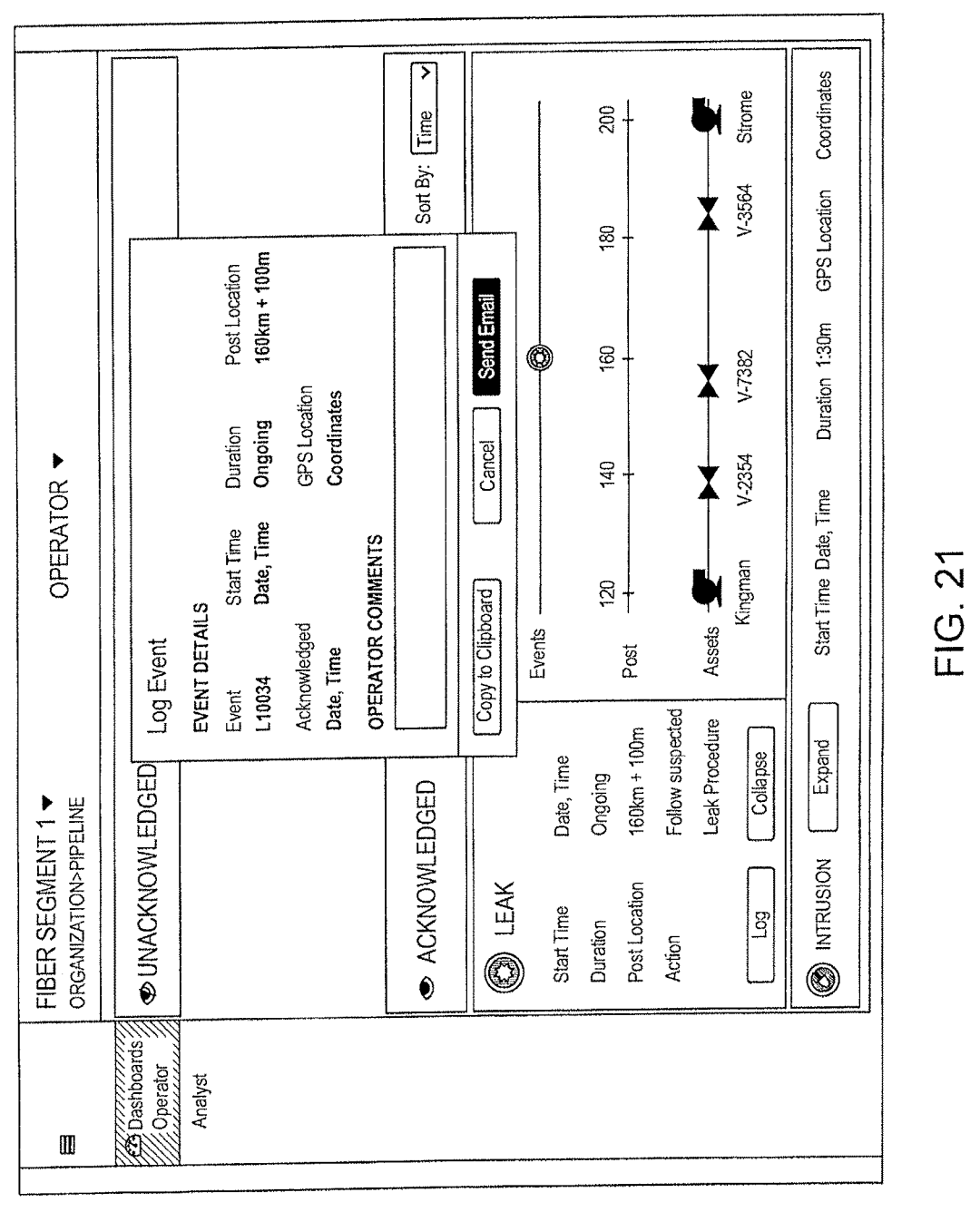
Figure 23:
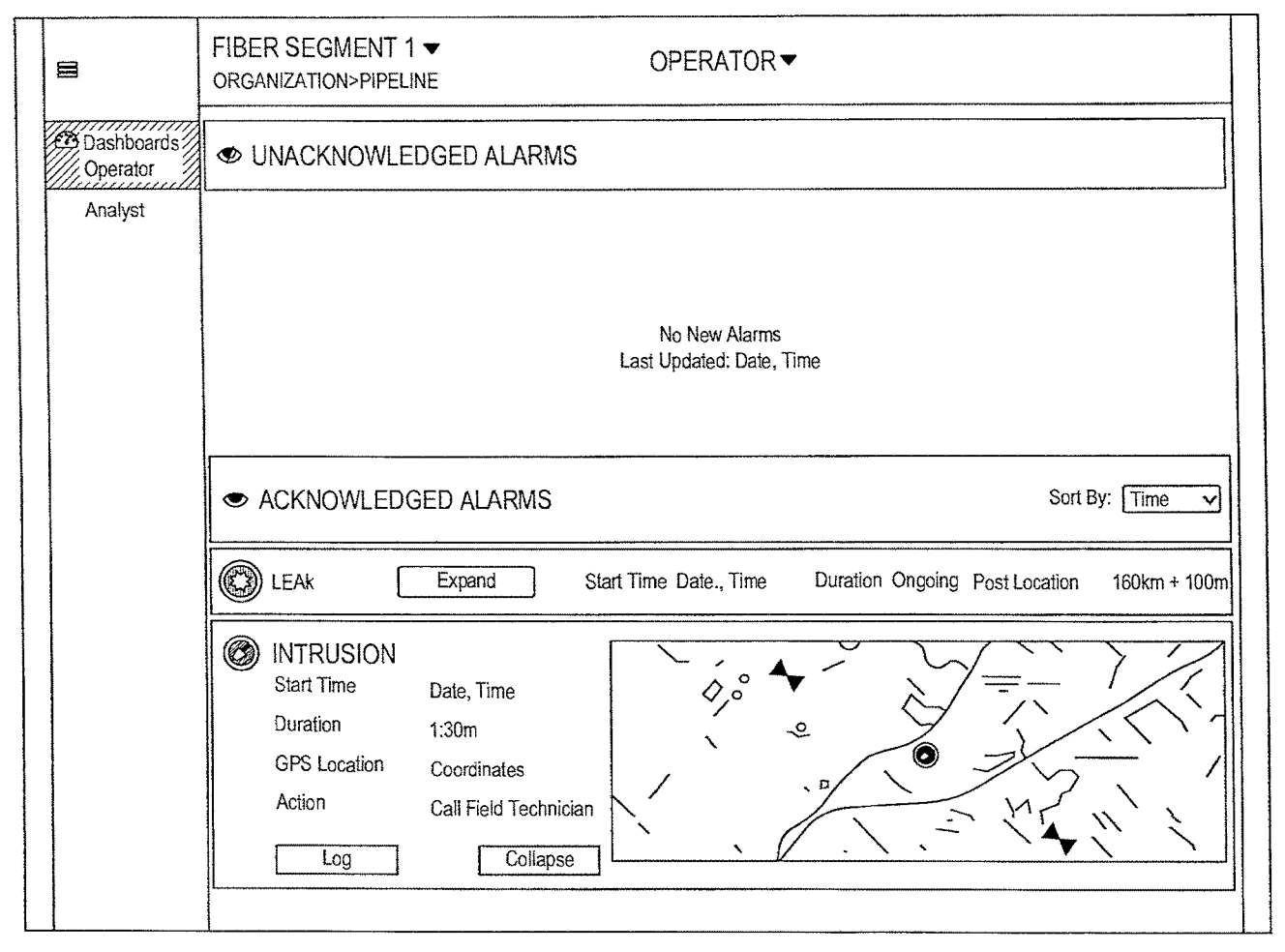

FIGS. 18-23 illustrate other exemplary embodiments of the operator view of the dashboard window of the user interface. As an example, FIG. 21 illustrates an operator view of event details of a logged event. The user can share the event details with one or more other users, such as through an email by clicking on the "Send Email" tab.

Figure 25:
FIG. 25 illustrates an exemplary embodiment of an event detail modal of a user interface of a pipeline management system displaying event details associated with an anomalous event including a schematic view and 2D graph.
Figure 26:
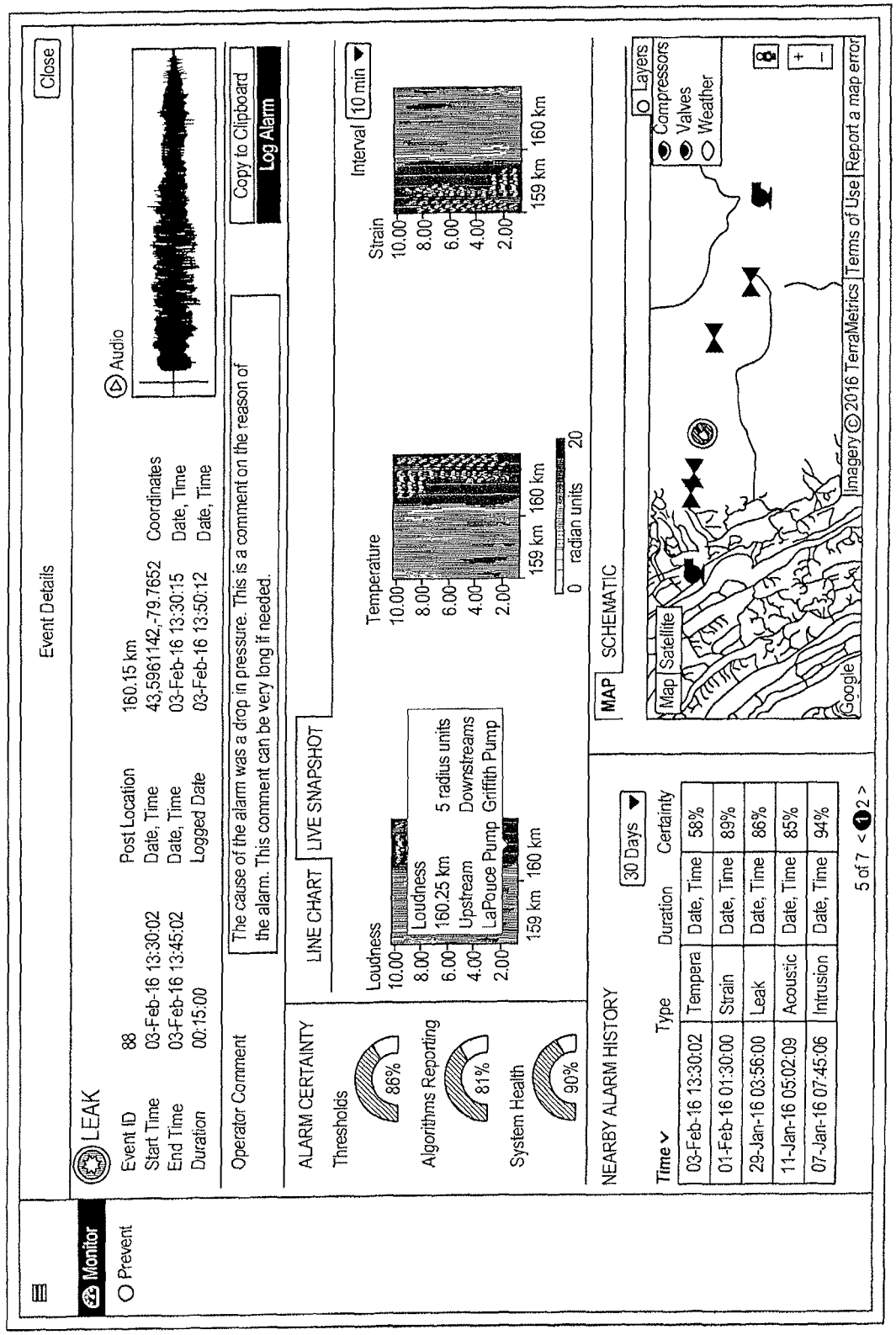
FIG. 26 illustrates another embodiment of an event detail modal of a user interface of a pipeline management system displaying event details associated with an anomalous event including a map view and 3D graphs.
Figure 27A:
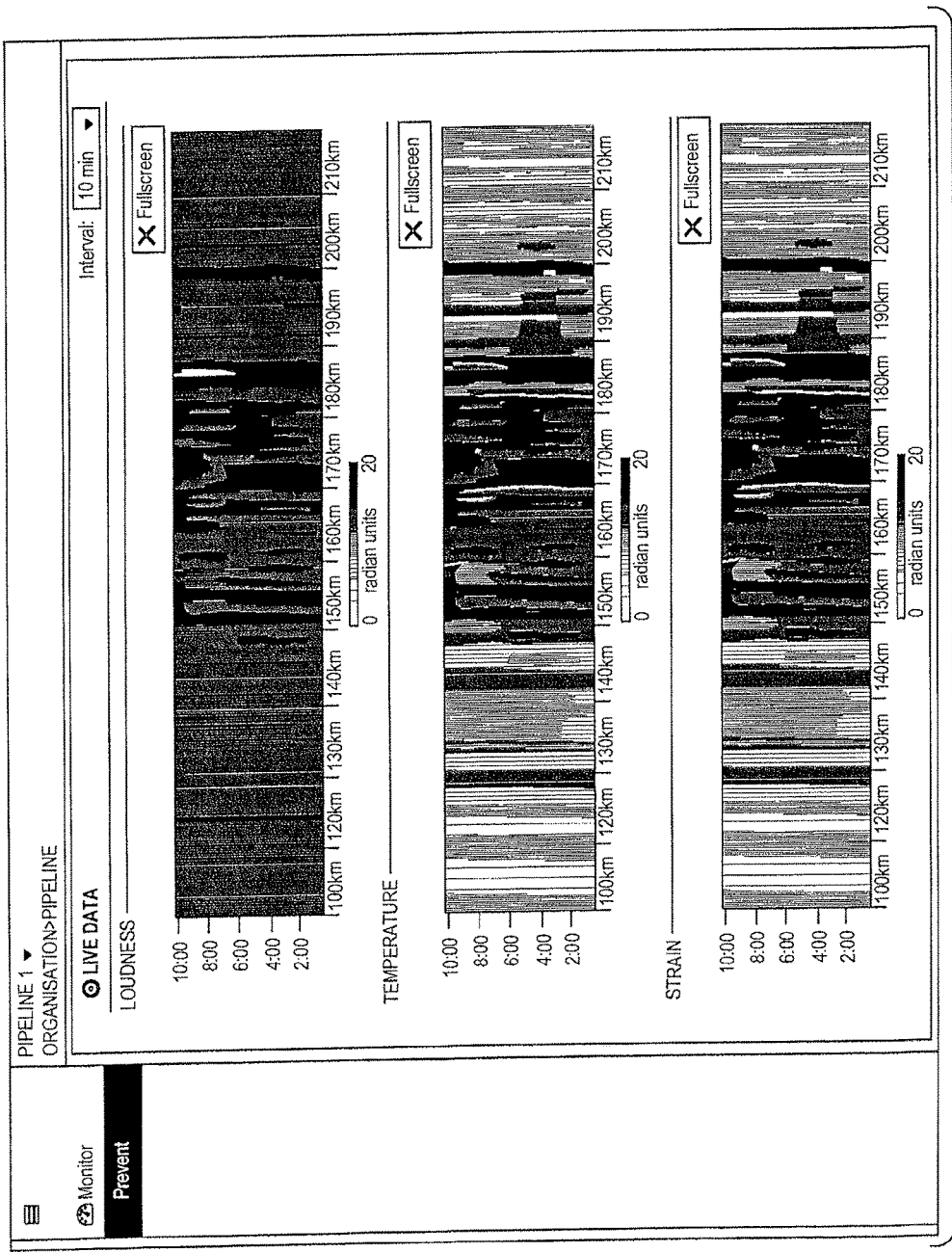
FIG. 27A illustrates a top portion of an exemplary embodiment of an analyze window of a user interface of a pipeline management system including live 3D graphs and a logged events section.
Figure 27B:
FIG. 27B illustrates a bottom portion of the analyze window of FIG. 27A.

FIGS. 24-26 illustrate another exemplary embodiment of a context browser of a user interface. A side bar of the user interface can include a "Monitor" tab and a "Prevent" tab (which can also be referred to as an "Analyze" tab). A user can monitor an anomalous event by clicking on the "Monitor" tab. In addition to information associated with the anomalous event (as described above), information obtained by analyzing anomalous event data can also be displayed. As shown in FIG. 25, for example, the context browser can display "Alarm Certainty" information (e.g., threshold, system health, etc.). FIGS. 27A-27B illustrate the analyze window obtained by the user clicking on the "Prevent" tab. In the analyze window, sensed information (e.g., loudness, temperature, strain) gathered by various sensors at various times can be simultaneously displayed.

FIGS. 28-53 provide aspects of an exemplary embodiment of a pipeline management system including a user interface configured to facilitate a user's monitoring and analysis of a pipeline system.

Figure 28:
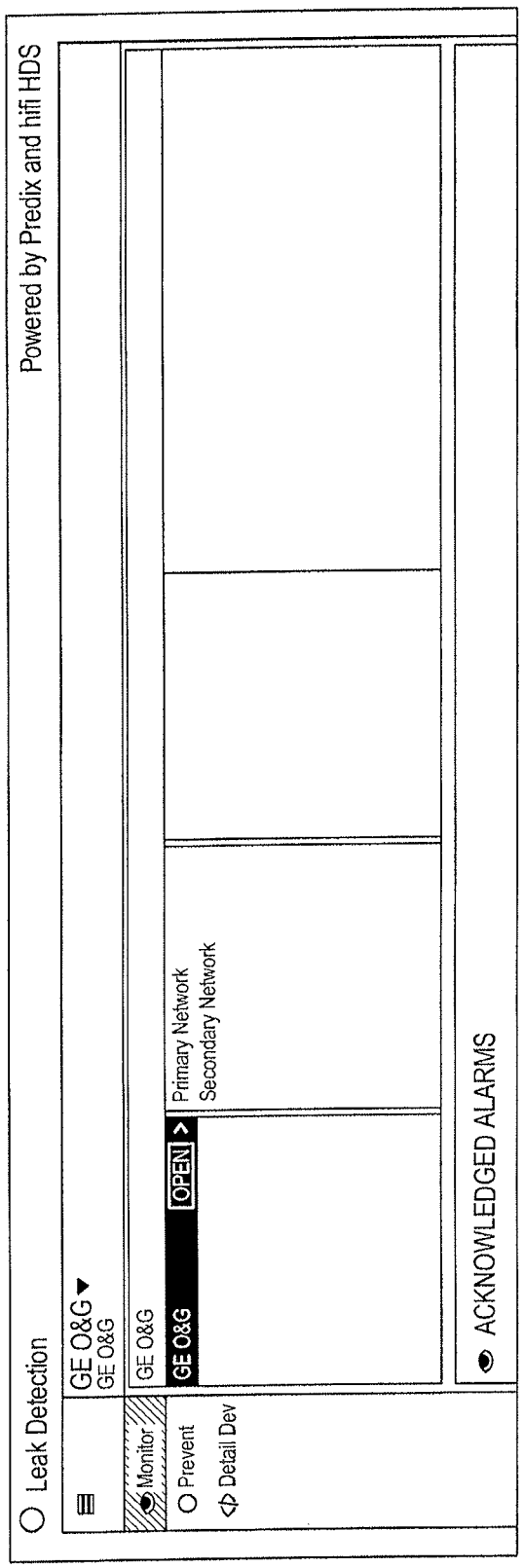
FIG. 28 illustrates an exemplary embodiment of a context browser of a user interface of a pipeline management system.

FIG. 28 illustrates a context browser of the user interface that can allow a user to navigate through a hierarchical menu in order to switch the context of the overall view of the user interface. The context browser is collapsed by default. In the default collapsed state, the context browser only shows the selected context, which is "GE O&G" at the top of the window in larger font in this illustrated embodiment, and its parent node, which is "GE O&G" in smaller font below the selected context in this illustrated embodiment. The context browser also includes a selector for switching views. The selector in this illustrated embodiment is an arrow (the solid black arrow next to the selected context), although other forms can be used as will be appreciated by a person skilled in the art. When a user clicks on or otherwise selects the title or arrow, the context browser expands from its default collapsed state to an expanded state which covers cards and other content on the page. The context browser in this illustrated embodiment uses Miller Columns, a pattern similar to that used in the Mac OS X "Finder" application, to represent a hierarchical tree structure using side-by-side drill-down panels. Selecting an item in the expanded context browser causes children of the selected item to show up in the next panel over, and also causes a selection icon (e.g., a button, etc.) to appear within the selected row to allow the user to submit/save that context, which also re-collapses the browser. FIG. 28 shows the context browser in the expanded state with the "GE O&G" item selected and highlighted such that the next panel over appears listing networks associated with that selected item, which are "Primary Network" and "Secondary Network" in this illustrated embodiment. When the context browser collapses, new data is loaded with that context. For example, when "Secondary Network" in FIG. 28 is selected, e.g., by clicking on "Secondary Network" and clicking on the "OPEN" button that appears next to "Secondary Network," the Secondary Network and all of its children's data loads, as shown in FIG. 29.

Figure 40:
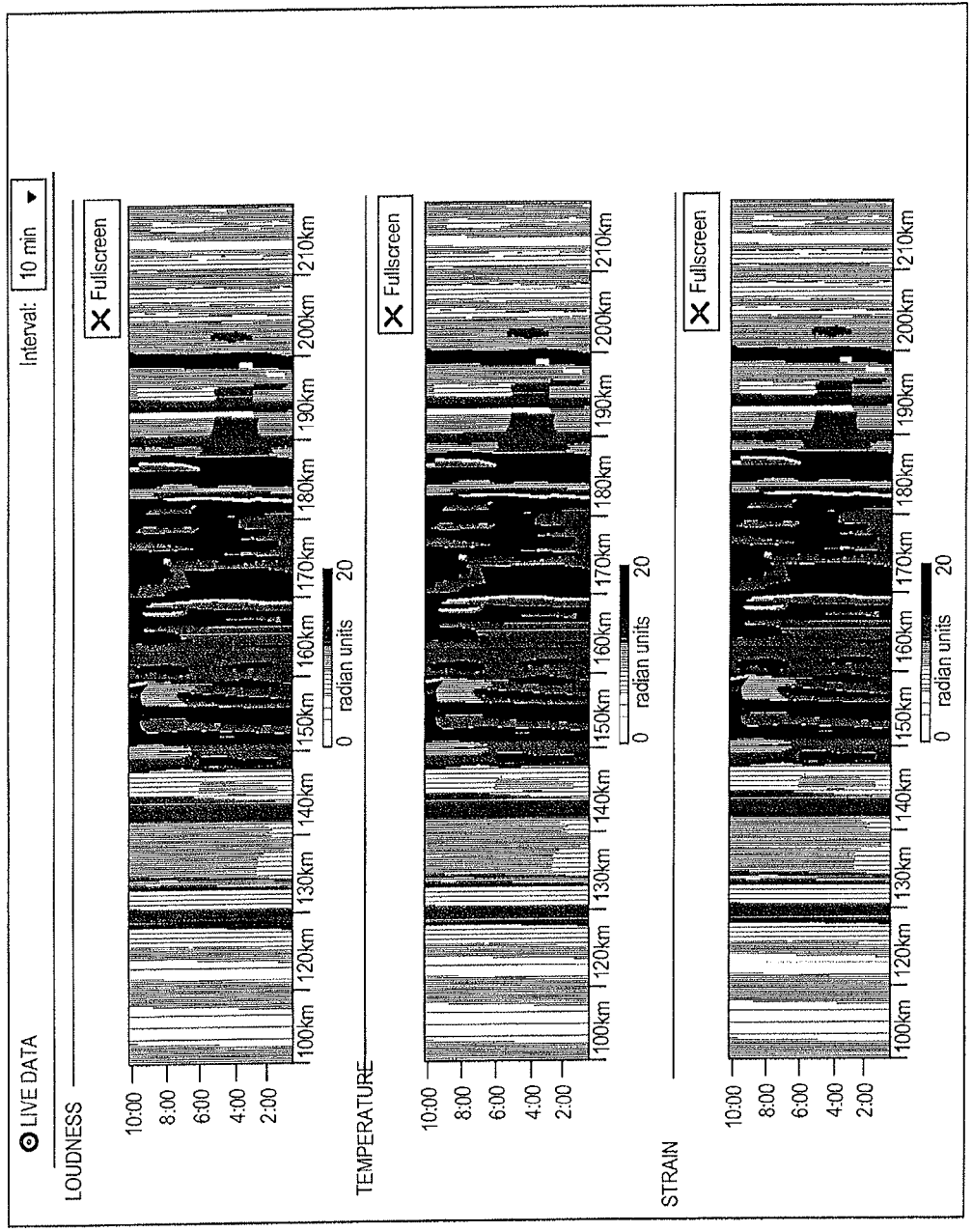
FIG. 40 illustrates an exemplary embodiment of a regular card showing live data.

FIGS. 30-41 illustrate various embodiments of cards that can be shown on the user interface. FIGS. 30-39 illustrate various aspects of alarm cards providing information regarding an alarm, and FIGS. 40 and 41 illustrate various aspects of regular cards providing information when there is no alarm.

As in this illustrated embodiment, all of the information shown on alarm cards are relevant to the specific alarm, which may allow for a user to quickly analyze the alarm and more quickly take steps to resolve the anomalous event. The alarm card can allow the user to access more detailed data if desired, which may help a user resolve a particularly difficult problem and/or make a more informed decision on any steps to be taken in response to the alarm.

Alarm cards can have different context, for example, two contexts, each of which displays a different array of selectable options (e.g., buttons, etc.) on the alarm card. FIG. 30 illustrates an unacknowledged context of an alarm card for alarms that have not yet been acknowledged by a user, and includes an "Acknowledge" selectable option to acknowledge the alarm and a "Detail" selectable option to view information regarding the alarm. FIG. 31 illustrates an acknowledged context of an alarm card for alarms that have been acknowledged by a user, and includes a "Log" selectable option to view logged information that alarm, a "Detail" selectable option to view information regarding the alarm, and a "Collapse" selectable option to hide the alarm.

Figure 32:
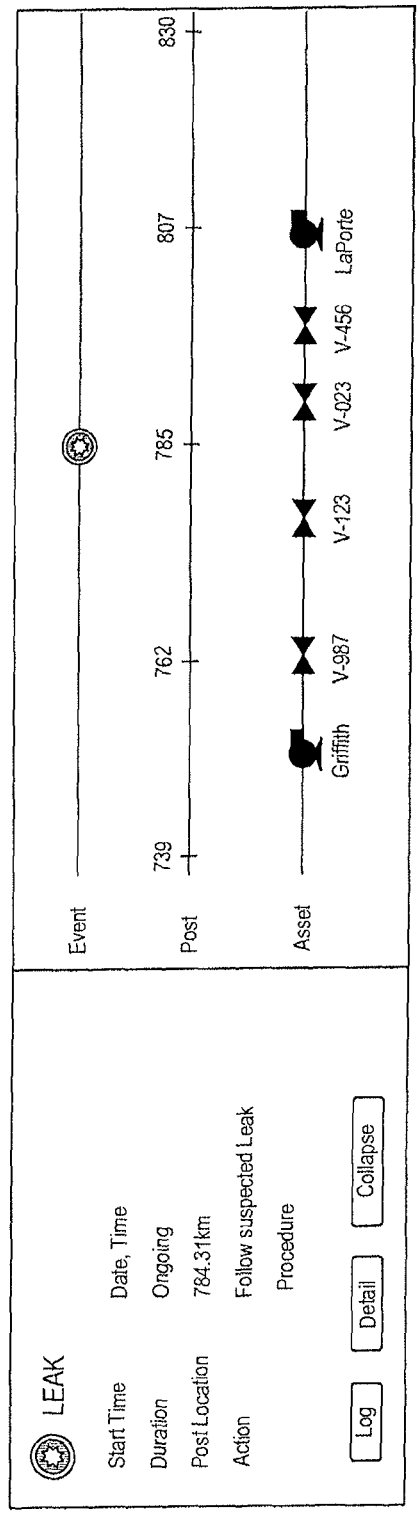
FIG. 32 illustrates an exemplary embodiment of an alarm card in an expanded state in the user interface of FIG. 28.
Figure 33:
FIG. 33 illustrates an exemplary embodiment of the alarm card of FIG. 32 in a collapsed state.

Alarm cards can have two viewable states, an expanded state and a collapsed state. An alarm card cannot be viewed in the expanded state until the alarm has been acknowledged. FIG. 32 illustrates an embodiment of an alarm card for a "leak" alarm in an expanded state. FIG. 33 illustrates the alarm card of FIG. 32 in an embodiment of a collapsed state.

Figure 34:
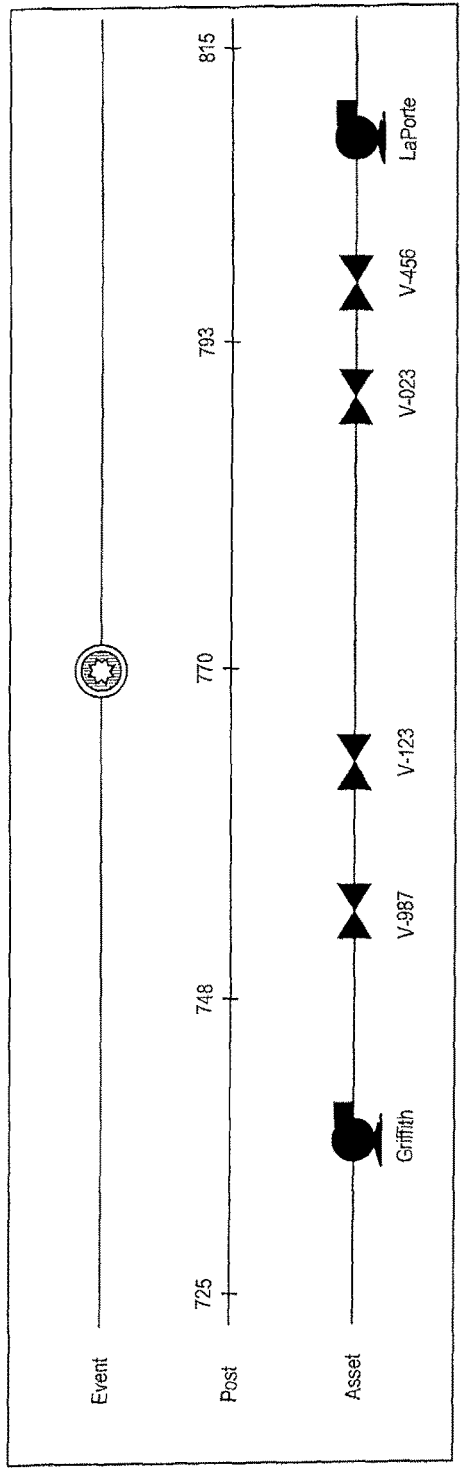
FIG. 34 illustrates an exemplary embodiment of a schematic visualization of an alarm card.
Figure 35:
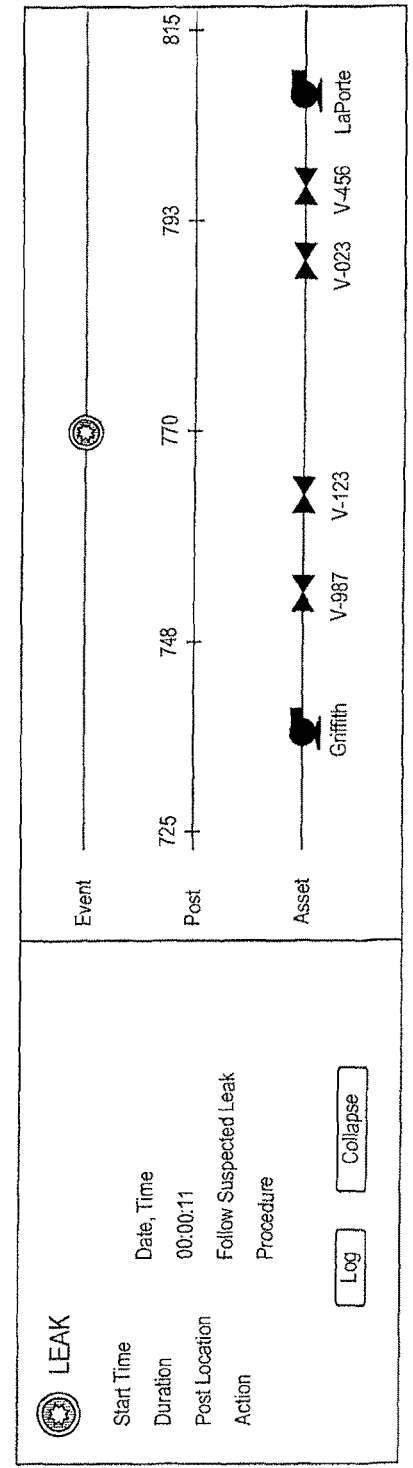
FIG. 35 illustrates the alarm card of FIG. 34.
Figure 52:
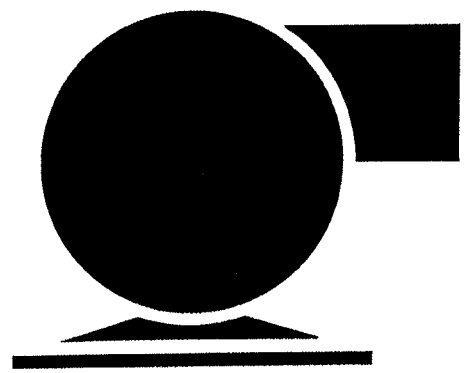
FIG. 52 illustrates an exemplary embodiment of a valve icon.
Figure 53:
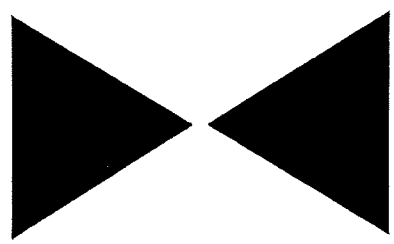
FIG. 53 illustrates an exemplary embodiment of a pump icon.

An alarm card can have a schematic configuration, which may help a user take appropriate action in response to the alarm. For example, a "leak" alarm can display a pipeline schematic so a user can see nearby assets. The appropriate action to take in response to a leak can vary. Since control rooms typically have very specific procedures set up to handle leaks, the appropriate action that is triggered can be to begin the set up leak handling procedure for the specific pipeline at issue. The schematic configuration provides post location, as opposed to GPS coordinates, in order to give a user the best estimate as to where the alarm has occurred along the pipeline. A map configuration of an alarm card, discussed further below, provides GPS coordinates and not post location. FIG. 34 illustrates an embodiment of a schematic configuration of a portion of an alarm card, which is shown in FIG. 35 including the portion of FIG. 34. The alarm card of FIG. 32 has a similar schematic configuration. As shown in FIGS. 32, 34, and 35, the schematic configuration includes a schematic visualization with three types of information, which are organized on three lines in this illustrated embodiment. The first type of information is event information that marks a location of the alarm event with an icon on a center of a line. The icon is a unique symbol uniquely identifying the anomalous event, in this case a red star icon (also shown in FIG. 47) for a leak. The color red is an intense icon color and is thus used for leak alarms as an indicator of urgency that action should be taken immediately. The second type of information is post information showing a distance that is determined by a length of the furthest pump, with that distance mirrored on the other side of the event. Some padding on the lines on either side of the event is provided in order for the pumps to not be right on the edge of the visualization. The third type of information is asset information showing assets along the post line. In the illustrated embodiment of FIGS. 34 and 35, two valves (valve icons labeled V-987 and V-123) are on a first, left side of the event, two valves (valve icons labeled V-023 and V-456) are on a second, right side of the event, one pump (pump icon labeled Griffith) is on the first side of the event, and one pump (pump icons labeled LaPorte) is on the second side of the event. The valve icon is shown in FIG. 52, and the pump icon is shown in FIG. 53. The two pumps serve as bookends for the schematic and are the closest pumps to the event. There may be more assets between the two pumps, but they are not shown because valves and pumps are the most actionable assets to display. In other embodiments, the additional assets may be shown to provide the user with a more complete understanding of the pipeline's assets closest to the alarm event.

An alarm card can have a map configuration, which may provide a user with spatial awareness for the alarm. For example, for an "intrusion" alarm, it is valuable for a user to see where, on a map, the intrusion is occurring. The appropriate action to take in response to an intrusion can vary. Since there will usually be a field technician or other person out in the field, the appropriate action that is triggered can be to call the field technician or other person in the field nearest the event to investigate the possible intrusion in person.

Figure 36:
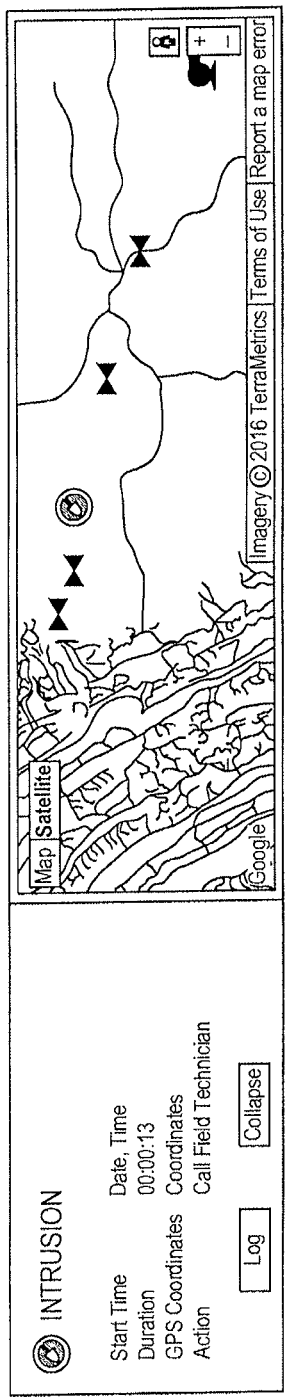
FIG. 36 illustrates an exemplary embodiment of a map visualization of an alarm card.

FIG. 36 illustrates an embodiment of a map configuration of an alarm card. As shown in FIG. 36, the schematic configuration includes a schematic visualization with two types of information, which are organized overlaid on a satellite map view in this illustrated embodiment. The map view can be overlaid on a map view instead, as selected by the user via, e.g., map/satellite buttons. The first type of information is event information that marks a location of the alarm event with an icon on the map. The icon is a unique symbol uniquely identifying the anomalous event, in this case a yellow shovel icon (also shown in FIG. 48) for an intrusion. The color yellow is a less intense icon color than red and is thus used for an alarm type less urgent than a "red" alarm type as an indicator that action should be taken quickly but not necessarily immediately. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

Figure 37:
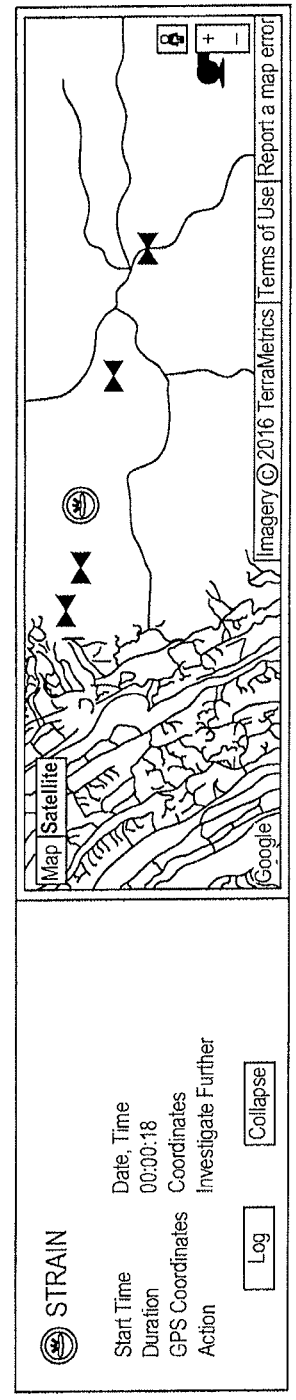
FIG. 37 illustrates another exemplary embodiment of a map visualization of an alarm card.

FIG. 37 illustrates another embodiment of a map configuration of an alarm card. As shown in FIG. 37, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue stress icon (also shown in FIG. 49) for a strain. The color blue is a less intense icon color than yellow and is thus used for an alarm type less urgent than a "yellow" alarm type as an indicator that action, such as an investigation of additional information via the alarm card's "Detail" button, should be taken as a preventative measure without action needing to be taken immediately. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 38 illustrates another embodiment of a map configuration of an alarm card. As shown in FIG. 38, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue thermometer icon (also shown in FIG. 50) for a problematic measured temperature, such as a temperature above a predetermined threshold temperature, a temperature below a predetermined threshold temperature, or a temperature outside a predetermined temperature range. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 39 illustrates another embodiment of a map configuration of an alarm card. As shown in FIG. 39, the schematic configuration includes a schematic visualization with two types of information, which are organized overlaid on a satellite map view in this illustrated embodiment, although the map view can be overlaid on a map view instead, as discussed above. The first type of information is event information that marks a location of the alarm event with an icon on the map. The icon is a unique symbol uniquely identifying the anomalous event, in this case a blue sound icon (also shown in FIG. 51) for a problematic measured noise, such as a noise above a predetermined threshold decibel level or a noise within a predetermined noise range that is typically indicative of an anomaly. The second type of information is asset information showing assets nearest the location of the event. In this illustrated embodiment, two valves are on a first, left side of the event, two valves are on a second, opposite side of the event, and one pump is on the second side of the event. There may be more assets present in the area shown on the map, but they are not shown because valves and pumps are the most actionable assets to display. In other embodiments, the additional assets may be shown to provide the user with a more complete understanding of the pipeline's assets closest to the alarm event.

FIG. 40 illustrates an embodiment of a regular card that shows live data. In other words, the regular card of FIG. 40 shows collected data in real time. The live data in this illustrated embodiment includes acoustic (loudness) data, temperature data, and strain data.

FIG. 41 illustrates an embodiment of a regular card that shows logged alarm data. In this illustrated embodiment, the logged alarm data for each alarm in the log includes an event ID, an event type, a start time of the event, an end time of the event, a duration of the event, when the event was acknowledged, when the event was logged, a post of the event, GPS coordinates of the event, and a "View" selectable icon to view any user-entered comments for that event.

Figure 42A:
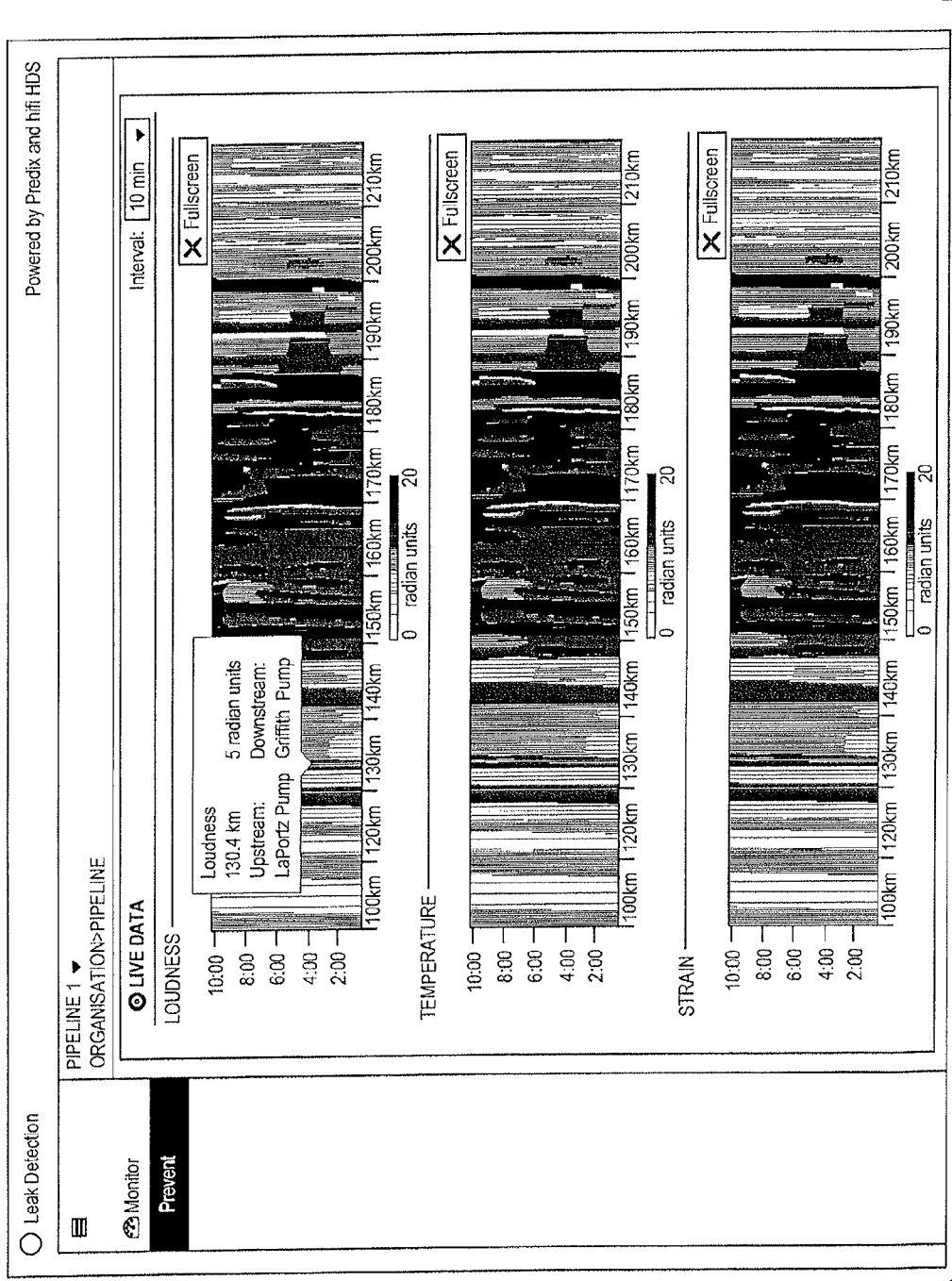
FIG. 42A illustrates a top portion of an exemplary embodiment of the user interface of FIG. 28 including the regular cards of FIGS. 27A-28.
Figure 45:
FIG. 45 illustrates a portion of the user interfaces of FIGS. 43 and 44.

FIGS. 42A-42B show a full screen view of the user interface including the live data regular card of FIG. 40, the logged data regular card of FIG. 41, and the user interface's side bar with user-selectable menu options for a "Monitor View" and a "Prevent" view. The "Prevent" view is selected in FIGS. 42A-42B.

The full screen view of FIGS. 42A-42B show the user interface in a non-critical, "lights on" mode in which the cards on the screen have a light background, white in this illustrated embodiment. The non-critical mode reflects that non-mission critical information is currently being shown on the screen. In the non-critical mode, no information about alarms is displayed. Examples of non-critical information include data that allows for proactive analysis (such as live data and logged data), user management data, company management data, and user interface settings or configuration.

Figure 43:
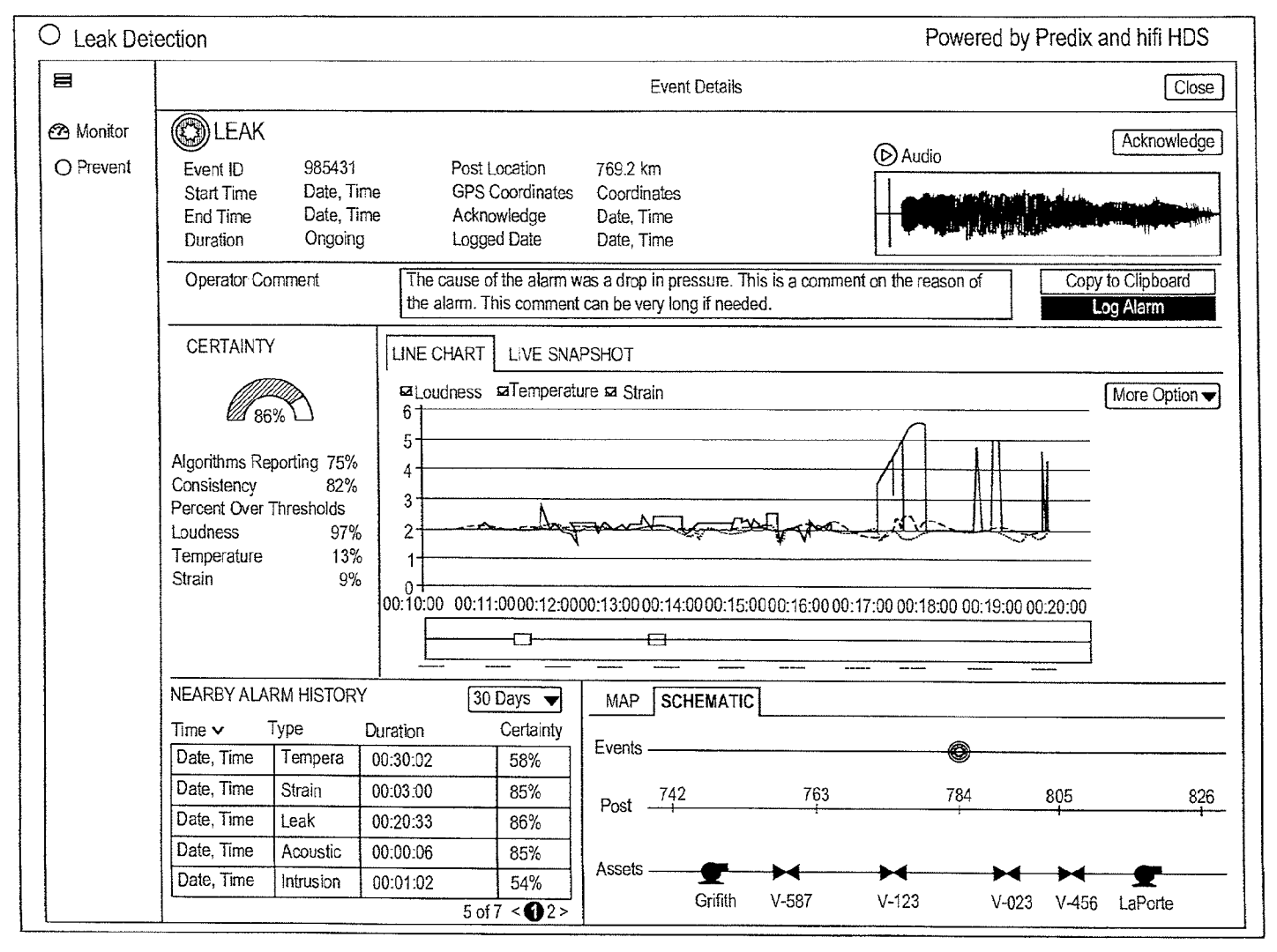
Figure 44:
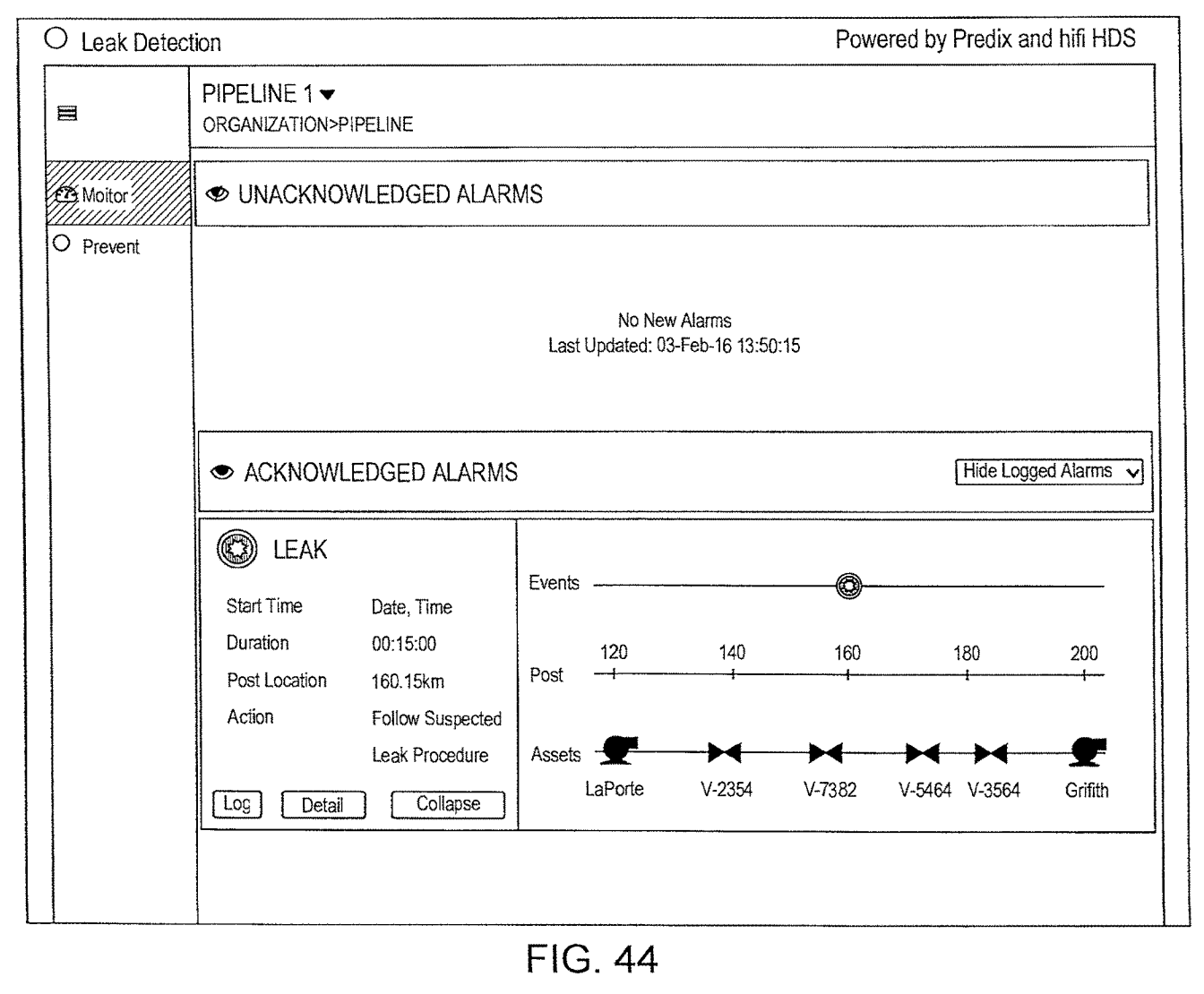
Figure 46:
FIG. 46 illustrates an embodiment of an alarm icon of the user interface of FIG. 28.
Figure 47:
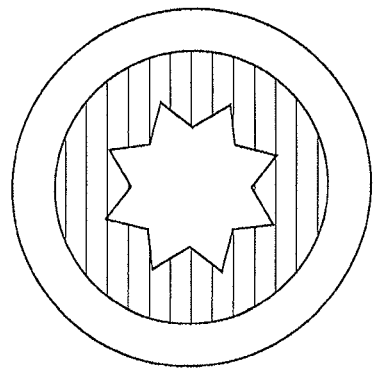
FIG. 47 illustrates an exemplary embodiment of a leak icon.
Figure 48:
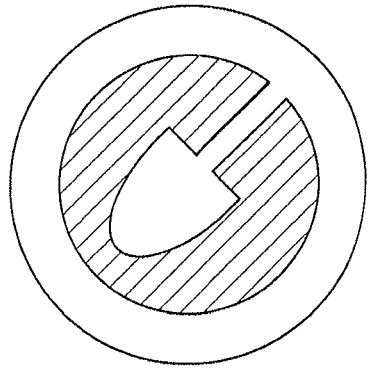
FIG. 48 illustrates an exemplary embodiment of an intrusion icon.
Figure 49:
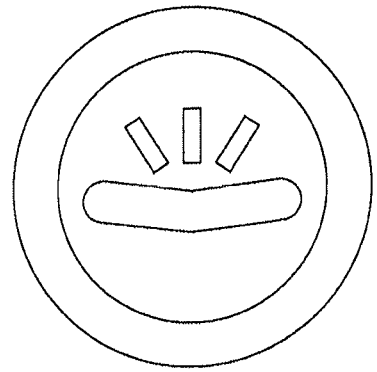
FIG. 49 illustrates an exemplary embodiment of a strain icon.
Figure 50:
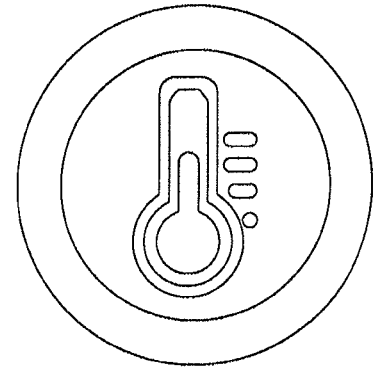
FIG. 50 illustrates an exemplary embodiment of a temperature icon.
Figure 51:
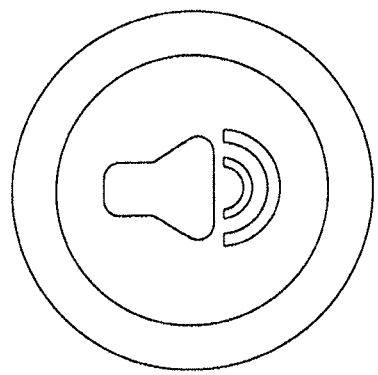
FIG. 51 illustrates an exemplary embodiment of an acoustic icon.

A full screen view on the user interface can be in critical, "lights off" mode in which cards on the screen have a dark background, dark gray in this illustrated embodiment. The critical mode reflects that mission critical information is currently being shown on the screen. Having color-coded critical and non-critical modes may help a user quickly determine the criticality of information on the screen and the urgency with which the user should review the information. Examples of critical information include alarm data, including alarm cards, alarm details, and alarm analysis. FIG. 43 shows an embodiment of the user interface in full screen view in critical mode. FIG. 44 shows another embodiment of the user interface in full screen view in critical mode. FIGS. 43 and 44 each include an alarm card showing information regarding an acknowledged leak alarm (different leaks alarms are shown in FIGS. 43 and 44). In each of FIGS. 43 and 44, the alarm icon is in color, which in this illustrated embodiment for a leak is the red leak icon of FIGS. 45 and 47, to indicate that the alarm still needs action to be taken by a user. Once the user has trigged one or more corrective actions in response to the alarm, the alarm icon is no longer in color and is shaded in the screen's background color, which is dark gray as shown in FIG. 46. The alarm icon being color-coded based on whether or not action still needs to be taken by a user may help the user quickly determine high-priority items for review and action. As discussed above, different types of alarms can be color-coded by urgency (e.g., red for highest urgency, blue for lowest urgency, and yellow for intermediate urgency), which may further help the user quickly determine high-priority items for review and action if multiple alarms are shown on the user interface.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The techniques described herein can be implemented using one or more modules. As used herein, the term "module" refers to computing software, firmware, hardware, and/or various combinations thereof. At a minimum, however, modules are not to be interpreted as software that is not implemented on hardware, firmware, or recorded on a non-transitory processor readable recordable storage medium (i.e., modules are not software per se). Indeed "module" is to be interpreted to always include at least some physical, non-transitory hardware such as a part of a processor or computer. Two different modules can share the same physical hardware (e.g., two different modules can use the same processor and network interface). The modules described herein can be combined, integrated, separated, and/or duplicated to support various applications. Also, a function described herein as being performed at a particular module can be performed at one or more other modules and/or by one or more other devices instead of or in addition to the function performed at the particular module. Further, the modules can be implemented across multiple devices and/or other components local or remote to one another. Additionally, the modules can be moved from one device and added to another device, and/or can be included in both devices.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Approximating language, as used herein throughout the specification and claims, may be applied to modify any quantitative representation that could permissibly vary without resulting in a change in the basic function to which it is related. Accordingly, a value modified by a term or terms, such as "about" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The devices, systems, and methods disclosed herein produce a number of advantages and/or technical effects in addition to or in alternative to any one or more of those discussed above. As an example, the user interface may be presented in a manner tailored to the role of the user, may provide context (e.g., location and historical data associated with the anomalous events, maps, location of other sites in the vicinity of the event etc.) for resolution of the anomalous event, and/or may allow users to remotely control a pipeline (e.g., adjust equipment such as valves and temperature control mechanisms along the pipeline) or contact maintenance personnel to address a detected event along the pipeline.

Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A detection system, comprising:
    a memory storing instructions;
    a display configured to show a user interface thereon; and
    a processor configured to execute the instructions in the memory which when executed cause the processor to perform operations that comprise:
    receive data characterizing one or more parameters sensed at a pipeline by one or more sensors placed along the pipeline configured to transport natural gas and/or petroleum, the one or more parameters indicative of leakages associated with the one or more sensors of the pipeline,
    analyze the data to determine that an anomaly is present at a geographic location of the one or more sensors of the pipeline,
    provide, in the user interface, a notification indicating that the anomaly is present, wherein the notification includes an acknowledgement status associated with the determined anomaly, the acknowledgement status indicating whether the determined anomaly has been noticed by an operator of the pipeline,
    receive, in the user interface, an acknowledgement input from the operator, the acknowledgement input indicating the determined anomaly has been noticed by the operator, and
    provide, in response to the received acknowledgement input, detailed information in the user interface, wherein the detailed information includes a time when the determined anomaly was acknowledged by the operator and the detailed information is provided as an overlay atop a map displayed in the user interface showing the geographic location of the determined anomaly.

2. The system of claim 1, wherein the anomaly includes one or more of a leak in the pipeline, an intrusion, strain, an acoustic event, and a rapid temperature change.

3. The system of claim 1, wherein the pipeline is a single pipeline.

4. The system of claim 1, wherein the pipeline includes multiple pipelines.

5. The system of claim 4, wherein the notification is coded to uniquely identify to the operator of the user interface which one of the pipelines has the determined anomaly.

6. The system of claim 1, wherein the notification is coded to uniquely identify to the operator of the user interface the type of anomaly detected, and the type of anomaly includes one of a leak, an intrusion, strain, an acoustic event, and a rapid temperature change.

7. The system of claim 1, further comprising a client terminal that includes the display, wherein the client terminal includes one of a desktop computer, a workstation, a minicomputer, a laptop computer, a tablet computer, and a smart mobile phone.

8. The system of claim 1, wherein providing the detailed information in the user interface further includes providing one or more of a schematic view of the anomaly without the map, live audio at the geographic location of the determined anomaly, a history of previously detected anomalies at the geographic location of the determined anomaly, frequency spectrogram information associated with the determined anomaly, pipeline fluid flow information at the geographic location of the determined anomaly, and a level of risk associated with the determined anomaly, and sensed parameter data for a period of time prior to a time of the determined anomaly's occurrence.

9. The system of claim 1, wherein the sensed parameter data includes at least one of acoustic data, temperature data, frequency data, strain data, and fluid flow rate data.

10. The system of claim 1, wherein the processor is configured to execute the instructions in the memory and thereby receive an input from the operator operating the user interface, the input requesting a corrective action be performed to address the anomaly that is determined to be present.

11. The system of claim 10, wherein the corrective action includes at least one of notifying maintenance personnel remotely located from the operator and located locally to the pipeline of the determined anomaly, and an instruction to cause remote adjustment of at least one device operatively coupled to the pipeline.

12. The system of claim 11, wherein the at least one device includes at least one valve.

13. A detection system, comprising:
a memory storing instructions;
a display configured to show a user interface thereon, the user interface configured to enable an operator of a pipeline to initiate a corrective action to an anomaly present in the pipeline, the pipeline configured to transport gas and/or petroleum; and
a processor configured to execute the instructions in the memory which when executed cause the processor to perform operations that comprise:
receive data characterizing one or more parameters sensed at the pipeline by one or more sensors placed along the pipeline, the one or more parameters indicative of leakages associated with the one or more sensors of the pipeline,
analyze the data to determine that the anomaly is present at a geographic location of the one or more sensors of the pipeline,
provide, in the user interface, a notification indicating that the anomaly is present, wherein the notification includes an acknowledgement status associated with the determined anomaly, the acknowledgement status indicating whether the determined anomaly has been noticed by the operator of the pipeline,
receive, in the user interface, an acknowledgement input from the operator, the acknowledgement input indicating the determined anomaly has been noticed by the operator, and
provide, in response to the received acknowledgement input, detailed information in the user interface, wherein the detailed information includes a time when the determined anomaly was acknowledged by the operator and the detailed information is provided as an overlay atop a map displayed in the user interface showing the geographic location of the determined anomaly; and
receive a request from the operator for the corrective action be performed to address the anomaly that is determined to be present, wherein the corrective action includes notifying maintenance personnel located remotely from the operator and located locally to the pipeline of the determined anomaly.

14. A detection method, comprising:
receiving at a processor, data characterizing one or more parameters sensed at a pipeline configured to transport natural gas and/or petroleum with one or more sensors placed along the pipeline, the one or more parameters indicative of leakages associated with a geographic location of the one or more sensors of the pipeline;
analyzing the data with the processor to determine that an anomaly is present at the geographic location of the one or more sensors of the pipeline, and
in response to determining that the anomaly is present, causing, by the processor, a notification to be presented on a user interface indicating that the anomaly is present, the user interface configured to enable an operator of a pipeline to initiate a corrective action to the determined anomaly present in the pipeline,
wherein the notification includes an acknowledgement status associated with the determined anomaly, the acknowledgement status indicating whether the determined anomaly has been noticed by the operator of the pipeline
receiving, in the user interface, an acknowledgement input from the operator, the acknowledgement input indicating the determined anomaly has been noticed by the operator, and
providing, by the processor, in response to the received acknowledgement input, detailed information in the user interface, wherein the detailed information includes a time when the determined anomaly was acknowledged by the operator and the detailed information is provided as an overlay atop a map displayed in the user interface showing the geographic location of the determined anomaly.

15. The method of claim 14, wherein the anomaly includes one or more of a leak in the pipeline, an intrusion, strain, an acoustic event, and a rapid temperature change.

16. The method of claim 14, wherein th e notification is coded to uniquely identify to the operator of the user interface the type of anomaly detected, and the type of anomaly includes one of a leak, an intrusion, strain, an acoustic event, and a rapid temperature change.

17. The method of claim 14, wherein the user interface is displayed on a display of a client terminal, and the client terminal includes one of a desktop computer, a workstation, a minicomputer, a laptop computer, a tablet computer, and a smart mobile phone.

18. The method of claim 14,
wherein providing the detailed information in the user interface further includes providing one or more of a schematic view of the anomaly without the map, live audio at the geographic location of the determined anomaly, a history of previously detected anomalies at the geographic location of the determined anomaly, pipeline fluid flow information at the geographic location of the determined anomaly, and a level of risk associated with the determined anomaly, and sensed parameter data for a period of time prior to a time of the determined anomaly's occurrence, wherein the sensed parameter data includes at least one of temperature data, frequency data, and strain data.

19. The method of claim 14, further comprising receiving at the processor an input from the operator operating the user interface, the input requesting the corrective action be performed to address the anomaly that is determined to be present, and the corrective action includes at least one of notifying maintenance personnel remotely located from the operator and located locally to the pipeline of the determined anomaly, and an instruction to cause remote adjustment of at least one device operatively coupled to the pipeline.

20. The method of claim 14, further comprising:
selecting, in the user interface by the operator, a maintenance personnel based on a location of the maintenance personnel with respect to the geographic location of the determined anomaly in the pipeline; and providing the maintenance personnel with the notification.

* * * * *